(12) United States Patent
Shibayama et al.

(10) Patent No.: US 6,308,593 B1
(45) Date of Patent: Oct. 30, 2001

(54) APPARATUS FOR ADJUSTING TIE ROD

(75) Inventors: Takao Shibayama, Saitama-ken; Atsushi Osada; Masaru Maruo, both of Tochigi-ken, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,590

(22) Filed: Apr. 7, 2000

(30) Foreign Application Priority Data

Apr. 9, 1999 (JP) ................................. 11-102546
Feb. 24, 2000 (JP) ................................. 12-047484
Feb. 24, 2000 (JP) ................................. 12-047485

(51) Int. Cl.$^7$ ............................................. B25B 13/00
(52) U.S. Cl. ............................................. 81/58.2; 81/57.4
(58) Field of Search ........................... 81/58.2, 57.13, 81/57.24, 57.29, 57.4

(56) References Cited

U.S. PATENT DOCUMENTS

| 4,777,851 | * | 10/1988 | Gubitose | ............................. | 81/57.37 |
| 5,040,438 | * | 8/1991 | Rousseau | ............................. | 81/57.35 |
| 5,690,005 | * | 11/1997 | Jung et al. | ........................... | 81/57.3 |

FOREIGN PATENT DOCUMENTS

| 0102727 | * | 6/1982 | (JP) | ................................ | 81/57.4 |
| 0124531 | * | 7/1984 | (JP) | ................................ | 81/57.4 |
| 289770-1989 |  | 11/1989 | (JP). |  |  |
| 295766/1989 |  | 11/1989 | (JP). |  |  |

\* cited by examiner

*Primary Examiner*—James G. Smith
*Assistant Examiner*—Hadi Shakeri
(74) *Attorney, Agent, or Firm*—Armstrong, Westerman, Hattori, McLeland & Naughton, LLP

(57) ABSTRACT

In a tie rod adjusting apparatus which adjusts a tie rod of a steering mechanism for steering a front wheel of a motor vehicle, an open end wrench is supported by a supporting mechanism which has a freedom of four axes so as to be movable in the vehicle width direction and the vehicle longitudinal direction, tiltable in the vehicle width direction, and tiltable about an axial line (U-axis) which extends longitudinally along the length of the open end wrench. A tilting member of the supporting mechanism for tilting in the vehicle width direction is supported by a guide rail which is arcuate with the top end portion of the open end wrench serving as a center of arc. By the arcuate movement of the tilting member along the guide rail, the open end wrench is tiltable in the vehicle width direction without deviating the top end portion thereof in the vehicle width direction.

5 Claims, 16 Drawing Sheets

APPARATUS FOR ADJUSTING TIE ROD

BACKGROUND OF THE INVENTION

1. Field of the Invention

The present invention relates to an apparatus for adjusting a tie rod by using an open end wrench, the tie rod being built in a steering mechanism of a vehicle such as a motor vehicle.

2. Description of the Related Art

A conventional steering mechanism for a motor vehicle has built therein, as shown in FIG. 19, a tie rod C which transmits the movement of a relay rod A which moves in interlocking with a steering handle to a knuckle arm B which rotatably supports a wheel. The tie rod C is made up of a rod main body C1 which is connected to the relay rod A through a ball joint A1, and a rod end C2 which is connected to the knuckle arm B through a ball joint B1. The end portion of the rod main body C1 is threaded into the rod end C2. By changing the depth of this threaded connection, the length of the tie rod C is varied, whereby the toe of the wheels can be adjusted. In the figure, reference characters C3 denote a tool engaging portion which is hexagonal in cross section and which is formed in the rod main body C1. Reference characters C4 denote a lock nut which prevents the rod main body C1 from rotating.

As an apparatus for adjusting this kind of tie rod by using an open end wrench which has at its top end a rod rotating portion for rotating the rod main body in the normal direction of rotation or in the reverse direction of rotation by engaging it with the tool engaging portion C3, there are known apparatuses in Japanese Published Unexamined Patent Application Nos. 289770/1989 and 295766/1989. These apparatuses are each provided with a carriage which vertically moves an open end wrench toward, and away from, a tie rod from a lower side of the vehicle which stays at a predetermined position. The open end wrench is supported on the carriage through a supporting mechanism which has a freedom of four axes so that the open end wrench can be moved in the vehicle width direction and vehicle longitudinal direction, tilted in the vehicle width direction, and rotated about an axis which extends in the longitudinal direction of the open end wrench.

According to this arrangement, the open end wrench is moved in the vehicle width direction and the vehicle longitudinal direction depending on the deviation in position of the tie rod in the vehicle width direction and in the vehicle longitudinal direction. Further, depending on the tilting of the tie rod in the vehicle longitudinal direction, the open end wrench is rotated about a vertical axis of the open end wrench and, depending on the tilting of the tie rod in the vertical direction, the open end wrench is tilted in the vehicle width direction. By these operations, the rod rotating portion at the top end of the open end wrench is engaged with the tool engaging portion so that the axis of rotation of the rod rotating portion coincides with the axial line of the rod main body of the tie rod. By the rotation of the rod rotating portion, the rod main body is rotated to thereby adjust the length of the tie rod.

Further, in this prior art, that tilting member of the supporting mechanism which extends in the vehicle width direction is constituted such that the open end wrench is tiltable in the vehicle width direction with a lower supporting shaft which is lower than the open end wrench serving as a fulcrum.

In the above-described conventional apparatus, when the open end wrench is tilted in the vehicle width direction by the movement of the tilting member, the top end of the open end wrench largely deviates in the vehicle width direction. In order to correct this deviation, it becomes necessary to largely move the open end wrench in the vehicle width direction. There is therefore a disadvantage in that the positioning work of the open end wrench relative to the tie rod becomes troublesome.

In view of the above points, the present invention has an object of providing an apparatus for adjusting a tie rod in which the positioning of the open end wrench relative to the tie rod can be made easily.

SUMMARY OF THE INVENTION

In order to attain the above and other objects, the present invention is an apparatus for adjusting a tie rod built in a steering mechanism of a vehicle, the tie rod having a rod main body and a tool engaging portion formed in hexagonal cross section in the rod main body, the apparatus comprising: an open end wrench having a rod rotating portion at a top end portion thereof, the rod rotating portion being adapted to be engaged with the tool engaging portion to rotate the rod main body in normal or reverse direction of rotation for adjustment of the tie rod; a carriage for moving the open end wrench toward and away from the tie rod from a lower side of the vehicle staying at a predetermined position; and a supporting mechanism for supporting the open end wrench on the carriage, the supporting mechanism having a freedom of four axes and supporting the open end wrench so as to be movable in a vehicle width direction and a vehicle longitudinal direction, tiltable in the vehicle width direction, and rotatable about a longitudinal axial line of the open end wrench, wherein a tilting member built in the supporting mechanism for tilting the open end wrench In the vehicle width direction is constituted such that the open end wrench is tiltable in the vehicle width direction by an arcuate movement of the tilting member, a center of an arc of the arcuate movement being coincident with the top end portion of the open end wrench.

According to the present invention, even if the open end wrench is tilted in the vehicle width direction by the movement of the tilting member, the top end portion of the open end wrench does not deviate in the vehicle width direction. Therefore, it is no longer necessary to perform the operation to correct the deviation in the vehicle width direction as a result of the tilting operation of the open end wrench in the vehicle width direction. The work of positioning the open end wrench relative to the tie rod becomes easier.

By the way, the conventional open end wrench has the following arrangement. Namely, a pair of first rotary member and the second rotary member which constitute a rod rotating portion and which have inserting grooves for inserting thereinto the tool engaging portion, are rotatably supported. at a top end portion of the wrench main body, so as to be rotatable about the same axial line. In one of the rotary members, e.g., in the second rotary member, three rollers "a" which serve as clamp members and are capable of contacting three circumferential portions of the tool engaging portion C3 are supported so as to be radially movable as shown in FIG. 20. On an inner circumference of the first rotary member "b" there are formed three pairs of cam surfaces c which come into contact with these rollers "a." When, in a state in which the second rotary member is kept braked by a brake means, the first rotary member b is rotated by the driving means in the normal or the reverse direction from the basic phase in which the inserting grooves of both the rotary members coincide with each other, three rollers "a" are pushed into a radially inward clamped position by each of the cam surfaces c so as to come into contact with the tool engaging portion C3. When the rollers "a" are in contact with the tool engaging portion C3, the second rotary member thereafter rotates integrally with the first rotary member b against the braking force of the brake means, whereby the tie rod is rotated in the same direction of rotation as that of the second rotary member b. Further, when the open end wrench is released from the tie rod, the first rotary member b is first rotated relative to the second rotary member in the direction of rotation which is opposite to that at the time of toe adjustment so as to return the first rotary member b to the above-described basic phase. By this operation, the rollers "a" are returned to the radially outward unclamped position. Then, the braking of the second rotary member by the braking means is released. In this manner, the second rotary member b is made into a state of being rotated as a result of the frictional force between the second rotary member and the first rotary member b. The first rotary member b is rotated in this state so that both the rotary members are returned to an origin phase (a state as shown in FIG. 20) in which the inserting grooves of both rotary members coincide with the rod inserting notch e at the top end of the wrench main body d. On an outer circumference of the first rotary member b there is formed a tooth portion. A pair of gears f which are engaged with this tooth portion are provided so that the first rotary member b can be rotated in the normal or the reverse direction of rotation by the driving means through the gears f.

In the above-described conventional apparatus, when the first rotary member b is returned to the basic phase and then to the origin phase, the second rotary member is caused to rotate by the accompanying frictional force with the first rotary member b to thereby return the second rotary member to the origin phase. However, the second rotary member sometimes ceases to rotate together with the first rotary member b due to the frictional force which works between the members (such as wrench main body or the like) other than the first rotary member b. In such a case, the phase of the first rotary member b relative to the second rotary member deviates from the basic phase. As a result, the clamp member which is made up of the rollers "a" moves from the unclamped position toward the clamped position. When the open end wrench is released from the tie rod, the clamp member gets caught by the tie rod. The open end wrench cannot therefore be successfully released from the tie rod.

As a solution, according to another feature of the present invention, the open end wrench further comprises: a pair of first rotary member and second rotary member constituting the rod rotating portion, each being supported at a top end portion of a wrench main body so as to be rotatable about an identical axial line, each having an inserting groove into which the tool engaging portion can be diametrically inserted; a clamp member mounted on one of the first rotary member and the second rotary member, so as to be movable between a clamped position in which the tool engaging portion is held in position and an unclamped position in which the holding is released; a cam mechanism for moving said clamp member from the unclamped position to the clamped position when the first rotary member is rotated relative to the second rotary member in normal or reverse direction of rotation from a basic phase in which inserting grooves of both the rotary members coincide with each other; driving means for driving the first rotary member through a gear which is engaged with a tooth portion formed in an outer circumference of the first rotary member; brake means for braking the second rotary member, wherein the gear is moveable back and forth in an axial direction such that the gear is engaged with, and disengaged from, a tooth portion formed in an outer circumference of the second rotary member.

When the open end wrench is released from the tie rod, the following steps are taken. Namely, first, while the second rotary member is kept braked by the brake means, the first rotary member is rotated through the gear in the direction opposite to the direction of rotation when the tie rod is rotated for adjustment. The first rotary member is thus returned to the basic phase in which the inserting grooves of both the rotary members coincide with each other, and the clamp member is returned to the unclamped position. Then, the braking of the second rotary member by the brake means is released. Thereafter, the gear is advanced in the axial direction so as to engage the gear with the tooth portion on the outer circumference of the second rotary member. In this state, the gear is driven again by the driving means to thereby return the first rotary member to a predetermined origin phase in which the tie rod can be released from the open end wrench. At this time, the second rotary member is also rotated integrally with the first rotary member through the gear. Therefore, when the first rotary member is returned to the origin phase, the phase of the first rotary member relative to the second rotary member does not deviate from the basic phase, whereby the clamp member is surely held in the unclamped position. In this manner, the open end wrench can be smoothly released from the tie rod without giving rise to the clamp member's getting caught by the tie rod.

When the first rotary member is returned to the basic phase, the first rotary member is rotated by that angle of relative rotation of both the rotary members which is required to move the clamp member to a position between the unclamped position and the clamped position. When the first rotary member is rotated in one of normal and reverse directions of rotation from the basic phase in order to hold the tool engaging portion by the clamp member, the clamp member may sometimes hold the tool engaging portion before the clamp member reaches the clamped position. In such a case, even if the first rotary member is rotated in the opposite direction by the above-described angle of relative rotation, the phase of the first rotary member relative to the second rotary member will no longer coincide with the basic phase. In this case, preferably the cam mechanism is arranged such that the clamp member is held in the unclamped position until the angle of rotation of the first rotary member from the basic phase relative to the second rotary member has exceeded a predetermined range of angle. Then, even if the phase of the first rotary member relative to the second rotary member does not coincide with the basic phase, the clamp member will be returned to the unclamped position as long as the first rotary member lies within the above-described predetermined range of angle. The clamp member can thus be prevented from getting caught by the tie rod when the open end wrench is released from the tie rod.

In the conventional open end wrench as shown in FIG. 20, unless the three pairs of the cam surfaces c are formed in congruence with each other at a phase difference of 120°, the tool engaging portion C3 will be held in a state of deviation relative to the rotary member, and the tie rod can no longer be rotated successfully. As a result, the allowable range of tolerance of the cam surfaces c becomes small, and machining at a higher accuracy becomes necessary.

As a solution, according to still another feature of the present invention, the open end wrench further comprises: a pair of first rotary member and second rotary member constituting the rod rotating portion, each being supported at a top end portion of a wrench main body so as to be rotatable about an identical axial line, each having an inserting groove into which the tool engaging portion can be diametrically inserted; a pair of clamp arms which are positioned on both sides of the inserting groove of the first rotary member and which are rotatably supported by the first rotary member so as to be swingable in a width direction of the inserting groove; a cam mechanism for moving both the clamp arms inward in the groove width direction to a predetermined clamped position when said first rotary member is rotated relative to said second rotary member in normal or reverse direction of rotation from a basic phase in which inserting grooves of both the rotary members coincide with each other; driving means for driving the first rotary member in normal or reverse direction of rotation; brake means for braking the second rotary member, wherein a bottom portion of the inserting groove of the second rotary member or a bottom portion of an inserting groove into which the tool engaging portion can be diametrically inserted and which is formed in a rod guide which is fixed to the top end portion of the wrench main body is formed into a semicircle which is equal in diameter to a circumscribing circle of a cross section of the tool engaging portion and which is coaxial with the axial line, wherein both the clamp arms are formed such that, at the clamped position, those contact sides of both the clamp arms which contact the tool engaging portion coincide with predetermined chords, among chords on both sides as seen in the groove width direction of the inserting groove of the first rotary member, on a circle which is equal in diameter to the circumscribing circle and which is coaxial with the axial line, the predetermined chords being inclined, relative to a center line of the inserting groove of the first inserting member, inward as seen in the groove width direction and having a larger distance between points of crossing of the circle with the predetermined chords at the open end side of the inserting groove of the first rotary member than a distance between opposite sides of cross-section of the tool engaging portion.

In rotating the tie rod, the first and the second rotary members are made into the basic phase in which the inserting grooves of both the rotary members coincide with each other and also coincide with the inserting groove of the rod guide. The tool engaging portion is then inserted into these inserting grooves. Thereafter, in a state in which the second rotary member is kept braked by the brake means, the first rotary member is rotated by the driving means in one of the normal and the reverse directions of rotation. According to these operations, both the clamp arms are swung into the clamped position by the operation of the cam mechanism. However, the contact sides of both the clamp arms coincide with the above-described predetermined chords at the clamped position. Therefore, as explained hereinbelow with reference to FIG. 16, before the contact side of the clamp arm in the forward position as seen in the direction of rotation of the first rotary member comes into contact with the tool engaging portion, the contact side of the clamp arm in the rear as seen in the direction of rotation comes into contact with that corner portion of the tool engaging portion which projects from the semicircular bottom portion of the inserting groove of the second rotary member or of the rod guide toward the open end of the inserting groove. The tool engaging portion is thus urged toward the semicircular bottom portion of the inserting groove to thereby coaxially align with both the rotary members. Here, even if the clamping position of the clamp arm in the forward as seen in the direction of rotation deviates inward of the inserting groove to a certain degree, the clamp arm in the rear as seen in the direction of rotation will come into contact with the tool engaging portion earlier. In this manner, even if the accuracy of the cam mechanism is rough, the tool engaging portion and both the rotary members can be coaxially held together.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
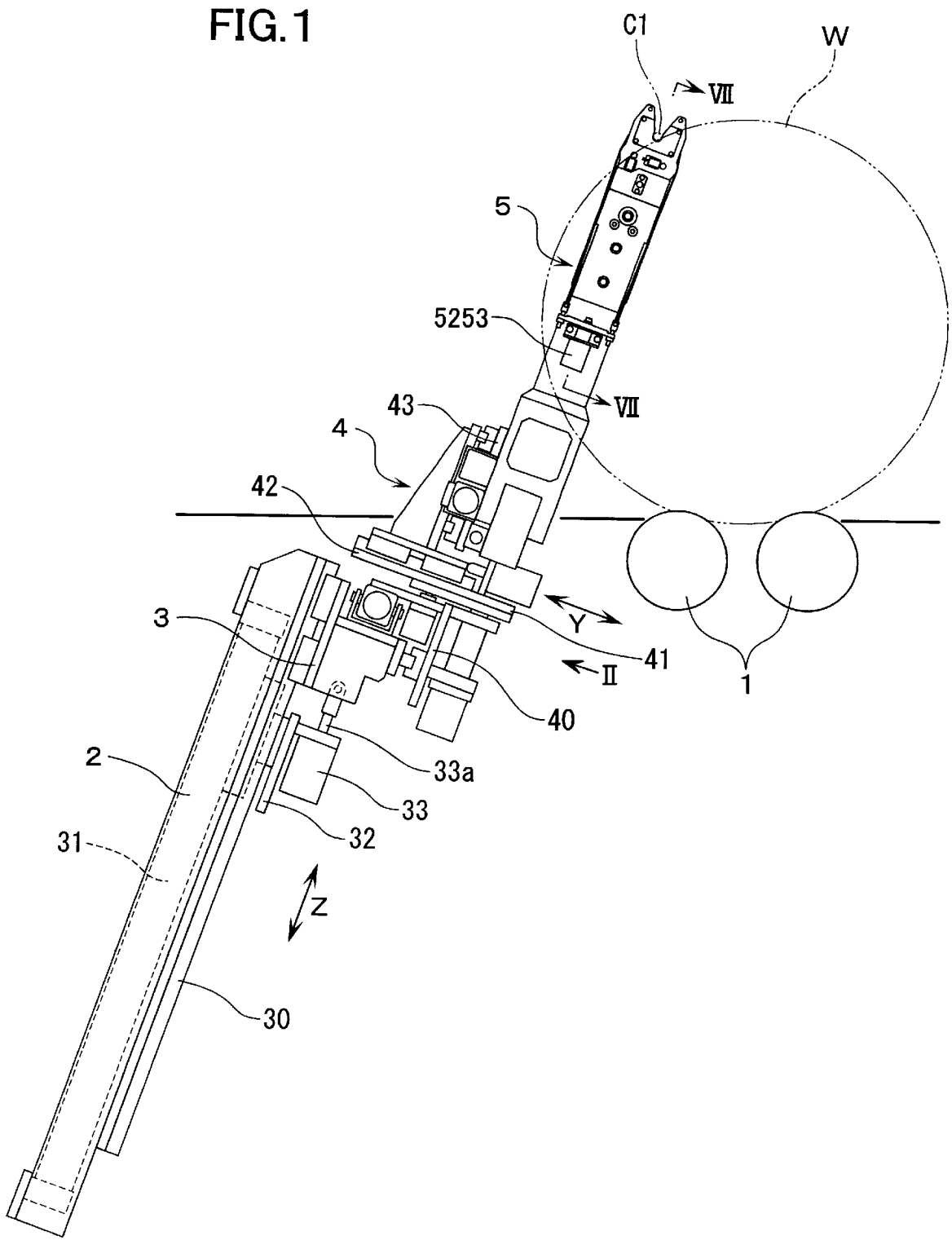
FIG. 1 is a side view of one example of the apparatus according to the present invention.
Figure 2:
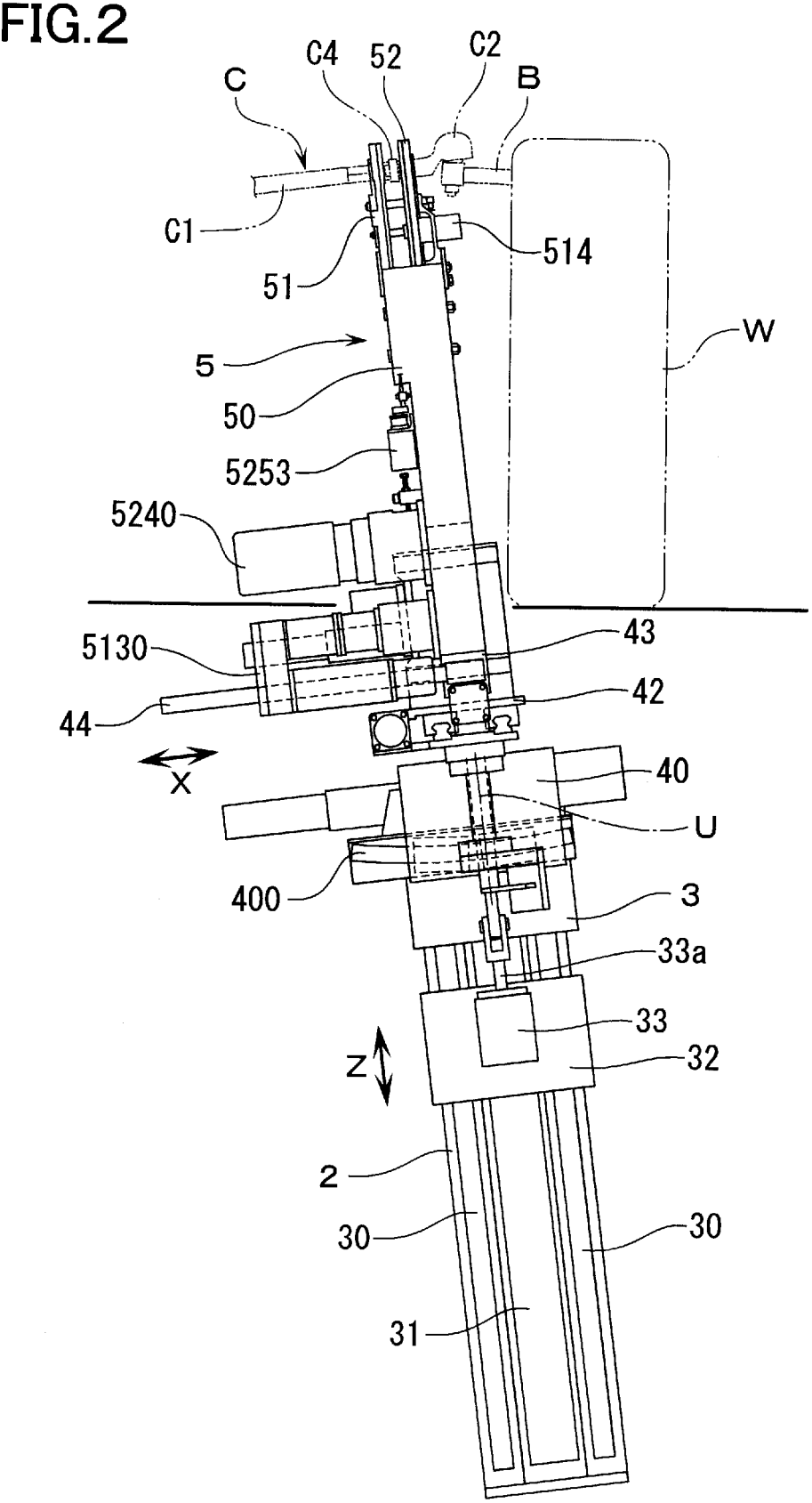
FIG. 2 is a front view as seen from the arrow II in FIG. 1.

With reference to FIGS. 1 and 2, an explanation will now be made about an embodiment in which the present invention is applied to a tie rod adjusting apparatus which is suitable to a so-called high-mount rack type of vehicle in which a tie rod C is disposed at a relatively high position of each front wheel W.

The tie rod adjusting apparatus is provided with a carriage 3 which is moved up and down along a guide frame 2 inside a pit of an adjusting station where rollers 1 are provided for mounting thereon the front wheel W. An open end wrench 5 is supported on the carriage 3 through a supporting mechanism 4 which has a freedom of 4 axes.

The carriage 3 is movable up and down in a direction (hereinafter called Z-axis direction) inclined, relative to the vertical direction, toward a vehicle longitudinal direction and a vehicle width direction, respectively at a predetermined angle. In other words, the carriage 3 is slidably supported by guide rails 30 which are fixed to the guide frame 2 so as to extend in the Z-axis direction. There is further provided a movable member 32 which is driven in the Z-axis direction by a rodless cylinder 31 which is disposed on the guide frame 2 so as to extend in the Z-axis direction. A piston rod 33a of a balance cylinder 33 which is mounted on the movable member 32 is connected to the carriage 3.

Figure 3:
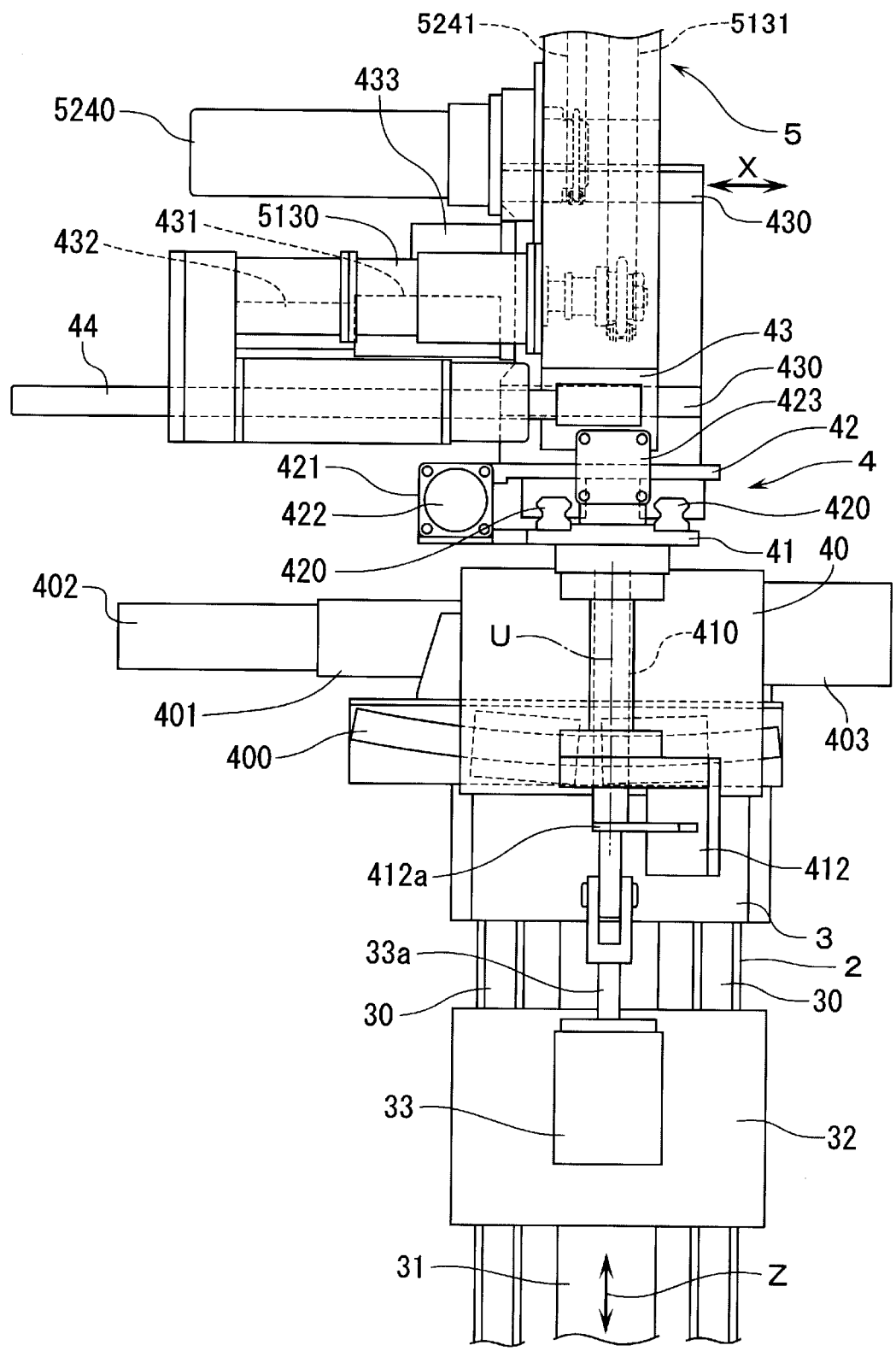
FIG. 3 is an enlarged front view of a supporting mechanism.
Figure 4:
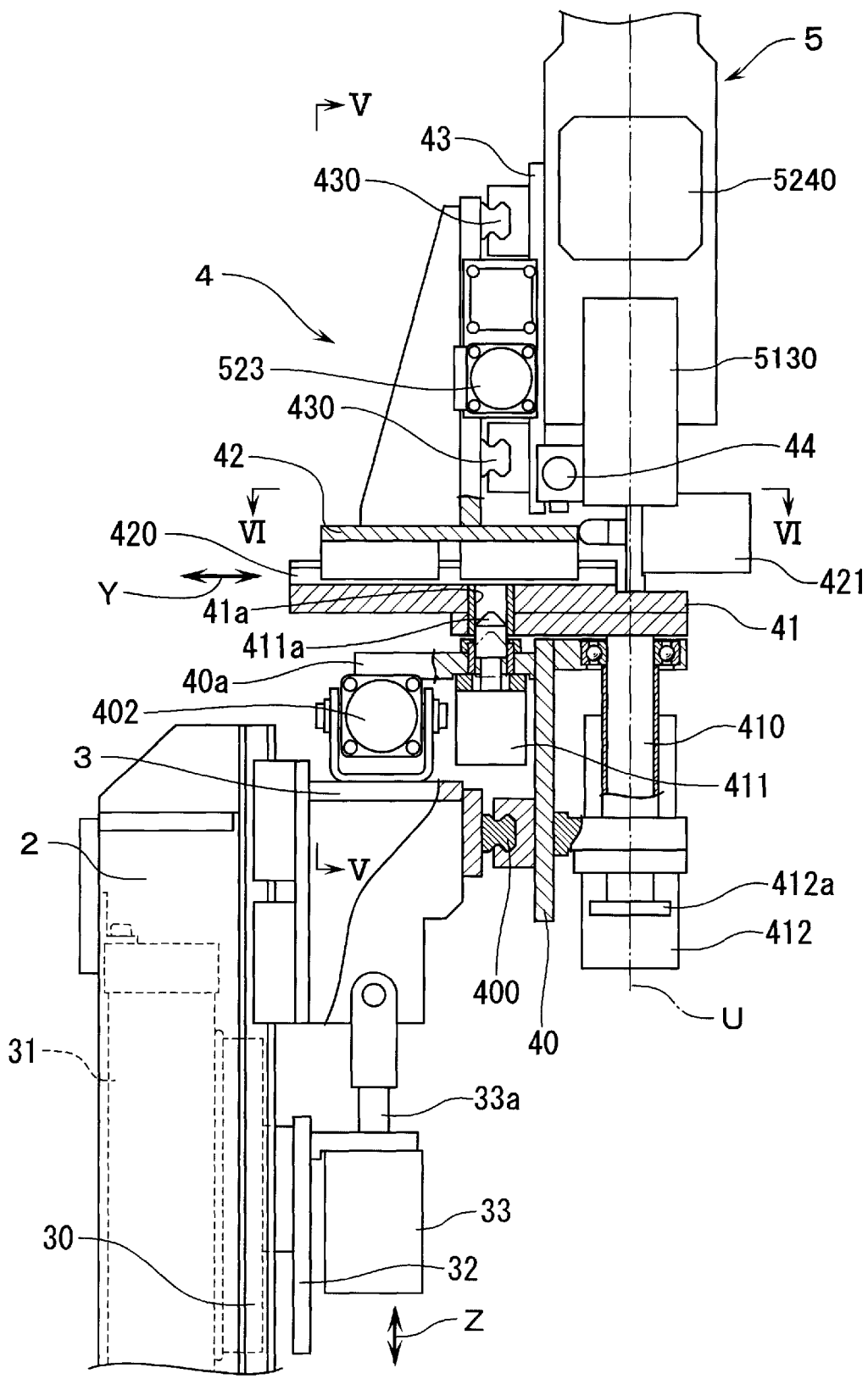
FIG. 4 is an enlarged side view of the supporting mechanism.
Figure 5:
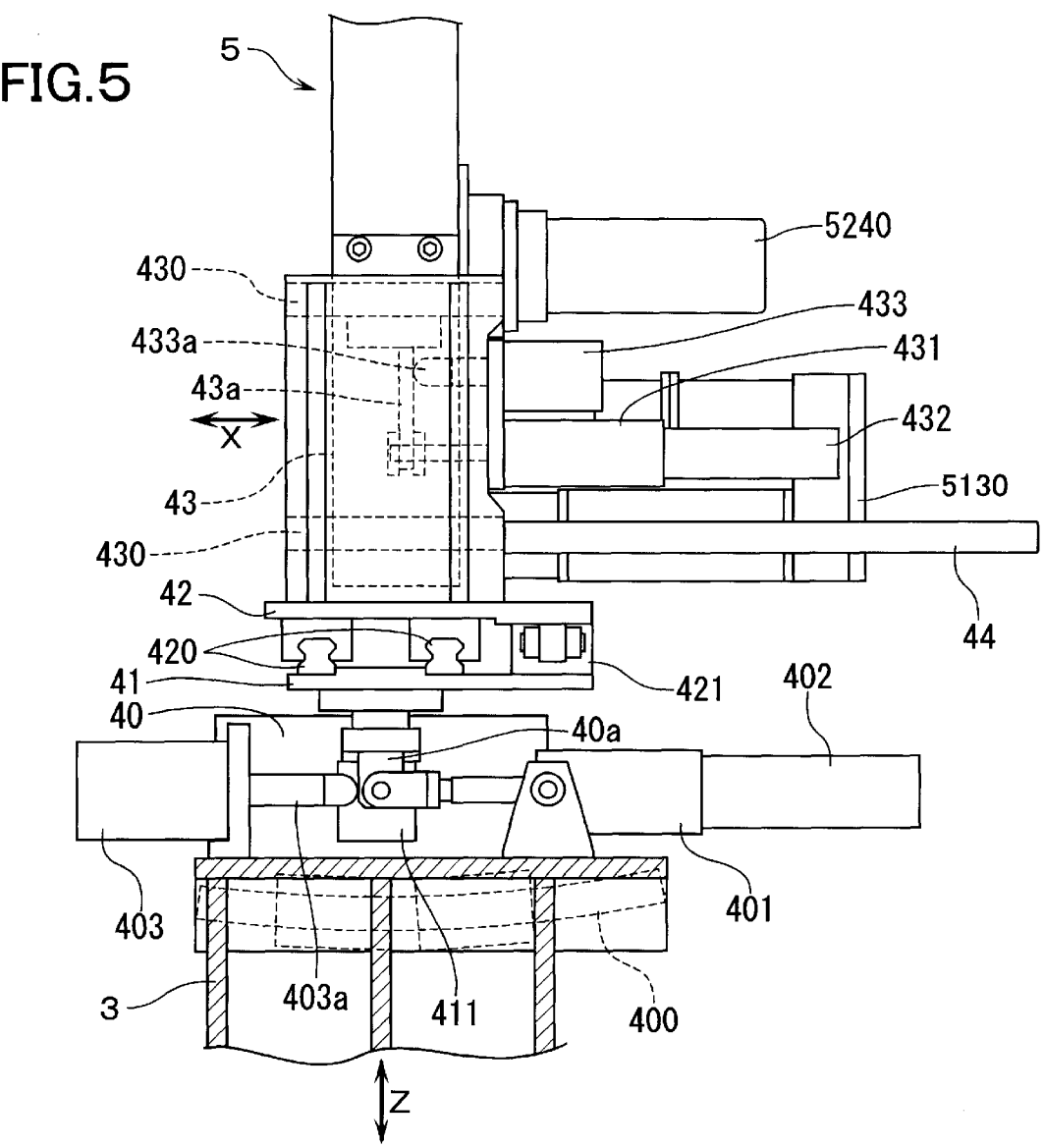
FIG. 5 is a sectional view taken along the line V—V in FIG. 4.

As shown in FIGS. 3 through 5, the supporting mechanism 4 is made up of: a tilting member 40 which moves the open end wrench 5 in a manner tiltable in the vehicle width direction on a plane parallel to the Z-axis; a rotary member 41 which is rotatably supported on the tilting member 40 through a shaft 410 extending in the direction of a U-axis which is parallel to the above described plane; a first sliding member 42 which is slidably supported by guide rails 420 which are fixed to the rotary member 41 and which extend in the Y-axis direction at right angles to the U-axis direction; and a second sliding member 43 which is slidably supported by guide rails 430 which are fixed to the first sliding member 42 and which extends in the X-axis direction at right angles to the U-axis direction and the Y-axis direction. The open end wrench 5 is mounted on the second sliding member 43 such that a longitudinal direction of the open end wrench 5 lies parallel to the U-axis.

In this manner, by the movements of both the first and the second sliding members 42, 43, the open end wench 5 can be moved in the vehicle width direction and in the vehicle longitudinal direction. Also, by the movement of the rotary member 41, the open end wrench 5 can be rotated about the longitudinally extending axial line of the open end wrench 5. On the second sliding member 43, there is mounted a handle 44 for moving the open end wrench 5.

The tilting member 40 is slidably supported by an arcuate guide rail 400 which is fixed to the carriage 3 and which is arcuate in shape with the top end of the open end wrench 5 serving as the center of arc. In this manner, as a result of an arcuate movement of the tilting member 40 along the guide rail 400, the open end wrench 5 can be tilted in the vehicle width direction with the top end of the open end wrench 5 serving as a fulcrum.

On a rear surface of the tilting member 40, there is provided an arm 40a in a projecting manner. On the carriage 3 there are mounted that cylinder 402 with a brake 401 which is connected to the arm 40a, and a cylinder 403 having a piston rod 403a which serves as a stopper facing or lying opposite to the arm 40a. In this arrangement, in a state in which the piston rod 403a of the cylinder 403 is pushed out, the arm 40a is made to contact the piston rod 403a and the brake 401 is operated in this state. Then, the tilting member 40 is locked to a neutral position. If the piston rod 403a of the cylinder 403 is pulled into the cylinder 403 and the brake 401 and the cylinder 402 are set free, the locking to the neutral position will be released so that the tilting member 40 becomes freely movable. Further, by an independent operation of the brake 401, the tilting member 40 can be locked to an arbitrary position.

In addition, the arm 40a is provided therein, in a vertically elongated manner, with a lock cylinder 411 for moving a taper pin 411a into and out of engagement with a hole 41a formed in the rotary member 41. By projecting the taper pin 411a upward to fit it into the hole 41a, the rotary member 41 can be locked to a predetermined neutral position. By the way, even in a state in which the taper pin 411a is pulled downward into the cylinder, the top end of the taper pin 411a still lies inside the hole 41a. The rotary member 41 can thus be freely rotated within a range which is restricted by the top end of the taper pin 411a. At the lower end of the shaft 410 of the rotary member 41, there is provided a tongue piece 412a which projects radially outward. A brake 412 which pinches the tongue piece 412a is mounted on the tilting member 40. By operating this brake 412, the rotary member 41 can be locked to an arbitrary position.

Figure 6:
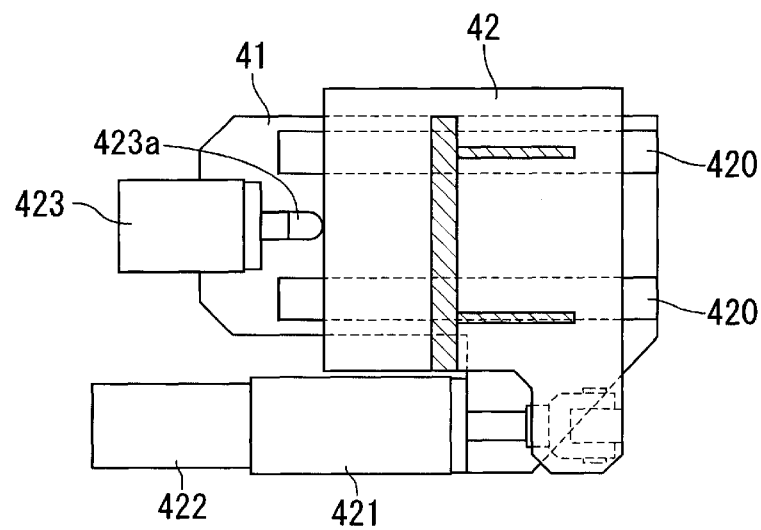
FIG. 6 is a sectional view taken along the line VI—VI in FIG. 4.

As shown in FIG. 6, the rotary member 41 has mounted thereon that cylinder 422 with a brake 421 which is connected to the first sliding member 42, and a cylinder 423 with a piston rod 423a which serves as a stopper facing an end edge of the first sliding member 42. Similarly, the first sliding member 42 has also mounted thereon that cylinder 432 with a brake 431 which is connected to a rib 43a formed on the second sliding member 43, and a cylinder 433 with a piston rod 433 which serves as a stopper facing the rib 43a. By operating these brakes 421, 431, the cylinders 422, 432 and the cylinders 423, 433, each of the sliding members 42, 43 can be locked to the predetermined neutral position. Also, by singly operating the brake 421, 431, each of the sliding members 42, 43 can be locked to an arbitrary position.

Figure 7:
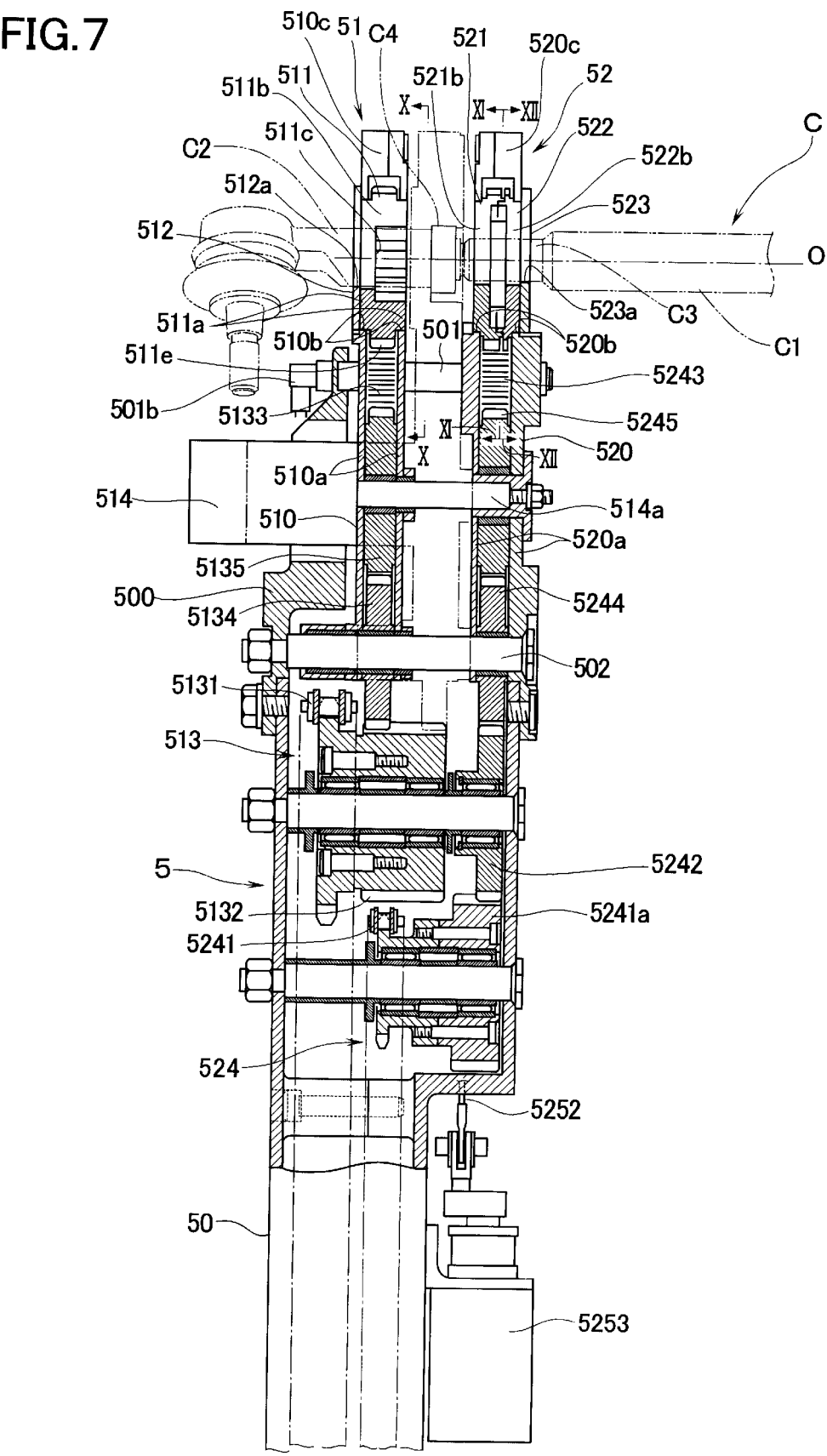
FIG. 7 is an enlarged sectional view cut along the line VII—VII in FIG. 1.
Figure 8:
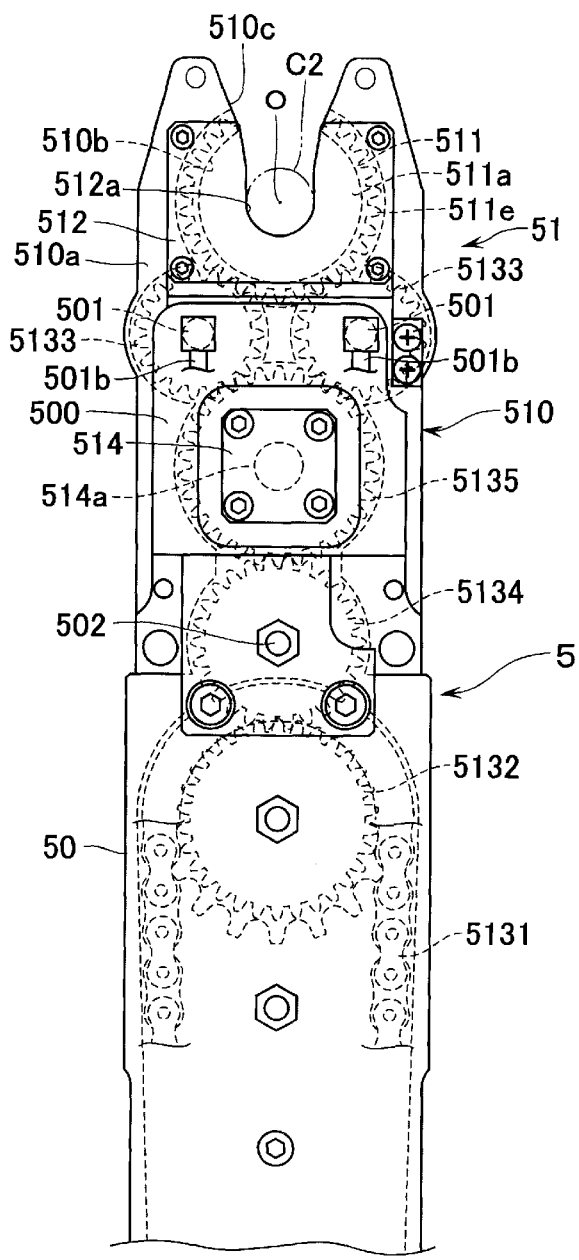
FIG. 8 is a left side view of FIG. 7.
Figure 9:
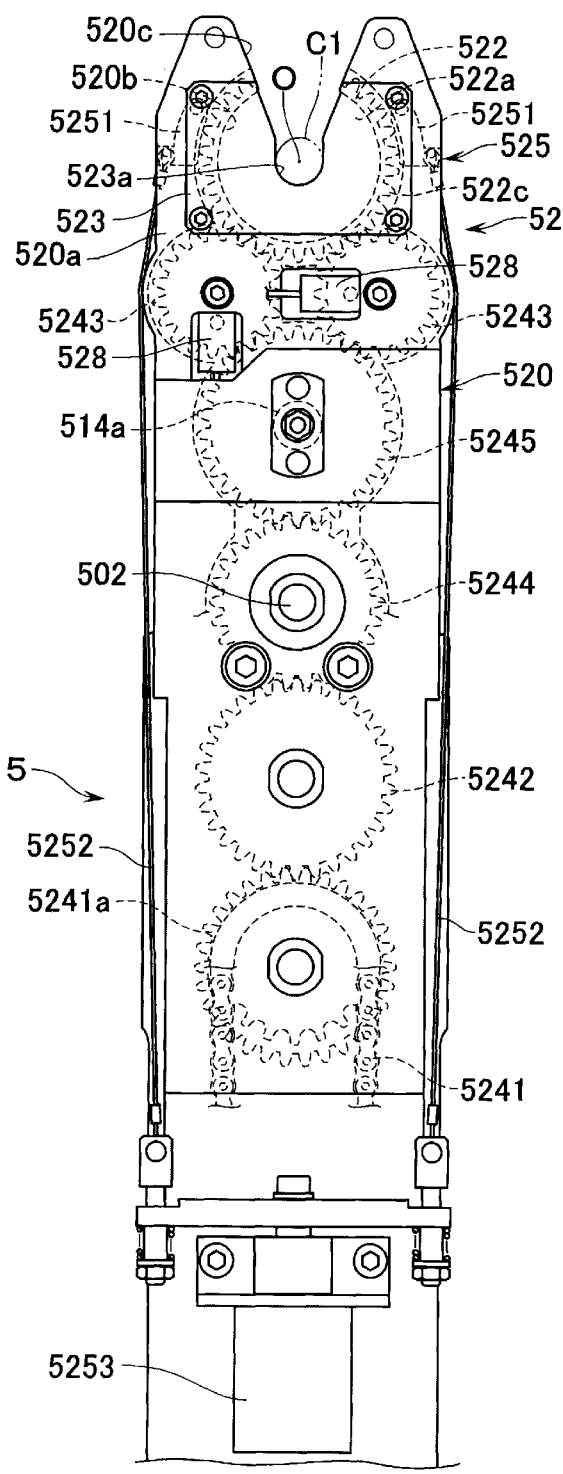
FIG. 9 is a right side view of FIG. 7.

As shown in FIGS. 7 through 9, the open end wrench 5 is constituted into a dual head type of wrench which is provided, at a top end portion of the wrench main body 50, with a nut rotating portion 51 which rotates the lock nut C4 of the tie rod C, and a rod rotating portion 52 which is engaged with the tool engaging portion C3 of the tie rod C to thereby rotate the rod main body C1 in the normal or the reverse direction of rotation.

The nut rotating portion 51 is provided with a rotary member 511 rotatably supported by a movable casing 510 which is supported on the wrench main body 50 so as to be movable in the axial direction of the tie rod C. The rotary member 511 is sandwiched between side plate portions 510a, 510a which are disposed on both axial sides of the movable casing 510. Each of the side plate portions 510a, 510a has formed therein a circular hole 510b, 510b which is coaxial with the other. A shaft portion 511a which is formed in a projecting manner on each axial side of the rotary member 511 is fitted into each of the circular holes 510b, 510b. The rotary member 511 is thus supported in a manner rotatable about an axial line "O" which is coaxial with the circular hole 510b.

Figure 10:
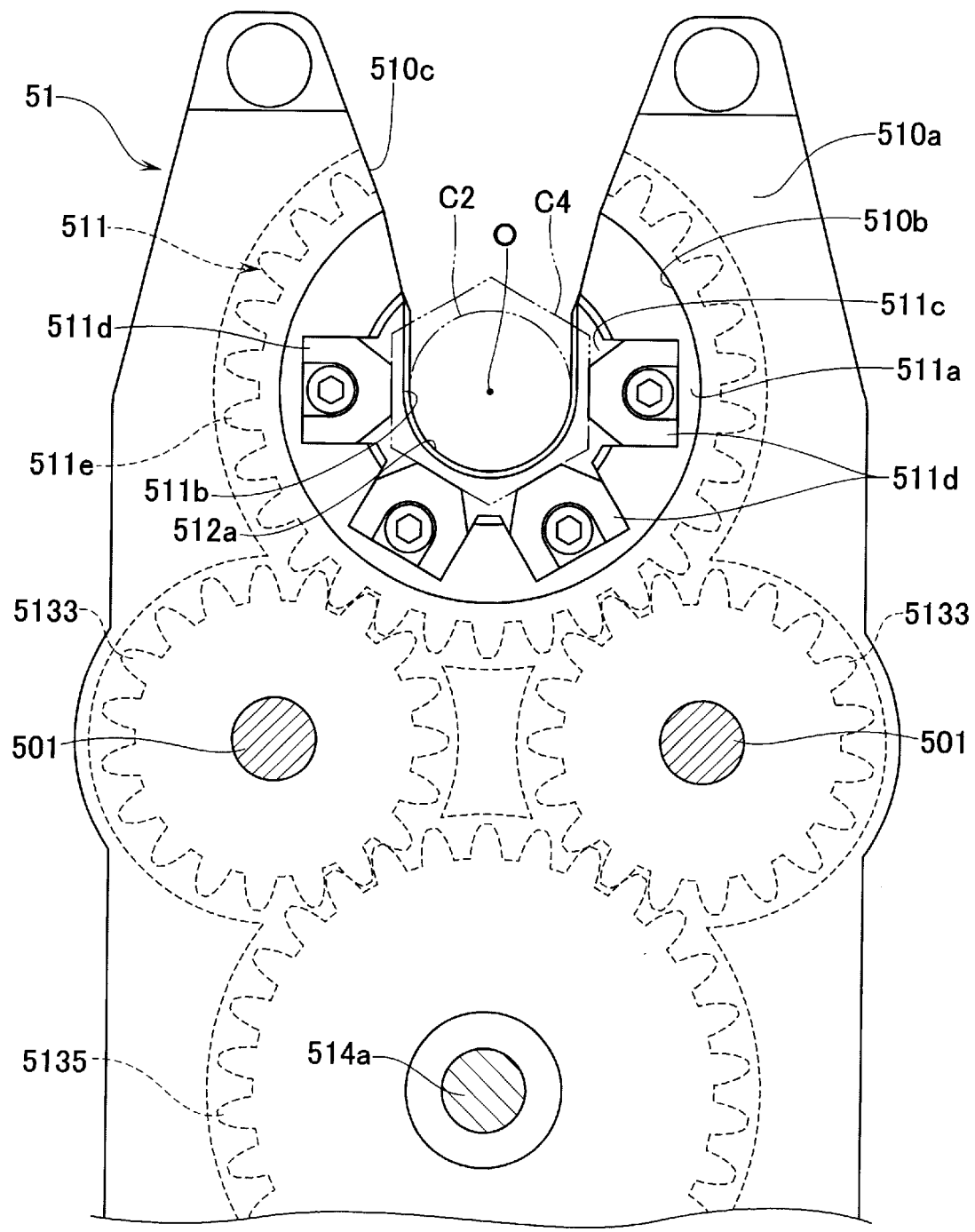
FIG. 10 is an enlarged sectional view taken along the line X—X in FIG. 7.

At the top end of each of the side plate portions 510a of the movable casing 510, there is formed an inserting notch 510c for inserting thereinto the rod end C2. The inserting notch is formed deep enough to reach the circular hole 510b. In addition, as shown in FIG. 10, the rotary member 511 has also formed therein an inserting groove 511b for inserting thereinto the rod end C2. The inserting groove 511b is formed so as to open toward the outer circumference of the rotary member 51. In this manner, once the rotary member 511 is arranged to be in a phase in which the inserting groove 511b coincides with the notch 510c, the rod end C2 can be inserted in the diametrical direction (or diametrically) into the inserting groove 511b through the notch 510c. In addition, a plate-shaped rod guide 512 is fixed with screws to the outer side surface of the side plate portion 510a which lies on the axially outside of the movable casing 510. This rod guide 512 has also formed therein an inserting groove 512a into which the rod end C can be diametrically inserted. The bottom portion of this inserting groove 512a is formed into a semi-circle which is equal in diameter to the outer diameter of the rod end C2 and which is coaxial with the center of the circular hole 510b, i.e., the center of an axis of rotation of the rotary member 511. By pushing the rod end C2 into the semi-circular bottom portion of the inserting groove 512a, the rod end C2 can be coaxially aligned with the rotary member 511.

The rotary member 511 is provided with a socket portion 511c into which the lock nut C4 can be axially inserted. Inside the socket portion 511c, there are provided a plurality of pieces 511d which are engageable with the lock nut C4. The lock nut C4 can thus be rotated by the rotation of the rotary member 511. The rotary member 511 is driven by the driving means 513 to rotate both in the normal and the reverse directions of rotation. The driving means 513 is made up of: a nut runner 5130 (see FIGS. 2 and 3) which is mounted on a base end portion of the wrench main body 50 and which serves as a driving source; a driving gear 5132 which is rotatably supported near the movable casing 510 of the wrench main body 50 and which is driven by the nut runner 5130 through a chain 5131; a pair of driven gears 5133, 5133 which are rotatably supported on the movable casing 510 so as to be engageable with a tooth portion 511e which is formed on an outer circumference of the rotary member 511; and two, i.e., first and second, intermediate gears 5134, 5135 which are rotatably supported on the movable casing 510 so as to connect the driving gear 5132 and the driven gears 5133, 5133 together.

On the wrench main body 50 there is mounted a bracket 500 which is positioned axially outside the nut rotating portion 51. Between this bracket 500 and a stationary casing 520, which is described in detail hereinafter, there are provided, in a manner to pass through the movable casing 510, a pair of supporting shafts 501, 501 for the driven gears 5133, 5133 as well as a supporting shaft 502 for the first intermediate gear 5134. The movable casing 510 is thus arranged to be movable in the axial direction through these supporting shafts 501, 501, 502. A cylinder 514 is mounted on the side plate portion 510a on an axially outside of the movable casing 510. A piston rod 514a of this cylinder 514 is connected to the stationary casing 520 in a state in which the piston rod 514a serves a dual purpose as a supporting shaft for the second intermediate gear 5135. In this manner, the movable casing 510 is moved by the cylinder 514 back and forth in the axial direction toward and away from the lock nut C4. As a result of this back and forth movements, the socket portion 511c can be engaged with, or disengaged from, the lock nut C4. The driving gear 5132 is formed longitudinally in the axial direction such that the first intermediate gear 5134 does not get out of engagement with the driving gear 5132 when the movable casing 510 moves in the axial direction.

Figure 13:
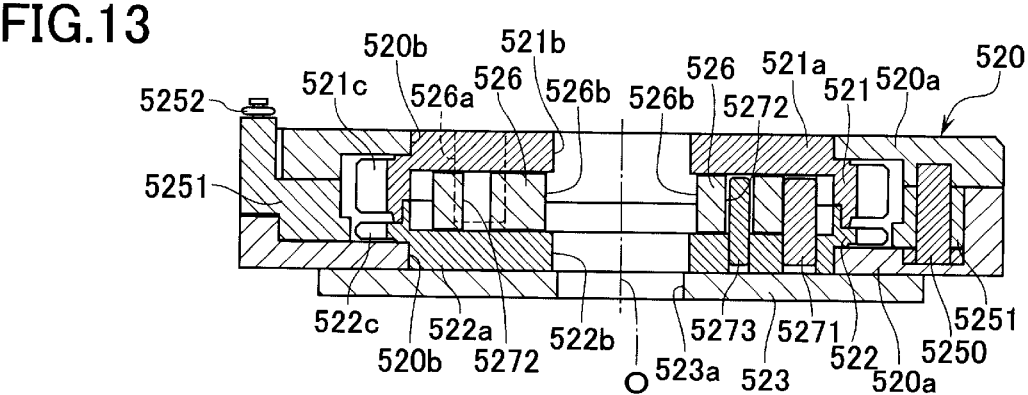
FIG. 13 is a sectional view taken along the line XIII—XIII in FIG. 11.

The rod rotating portion 52 is provided with a pair of, i.e., first and second, rotary members 521, 522 which are rotatably supported by the stationary casing 520 which is fixed to the wrench main body 50. As shown in FIGS. 7 and 13, both the rotary members 521, 522 are sandwiched between side plate portions 520a, 520a on both axial sides of the stationary casing 520, in a manner of being fitted together. Circular holes 520b, 520b which are coaxial with the circular hole 510b of the movable casing 510 are formed in both the side plate portions 520a, 520a. Shaft portions 521a, 522a which are formed in a manner projecting from the axially outside surface of the respective rotary members 521, 522 are fitted into the respective circular holes 520b, 520b. Thus both the rotary members 521, 522 are supported so as to be rotatable about the axial line "O" which is coaxial with the axis of rotation of the rotary member 511 of the nut rotating portion 51.

Figure 11:
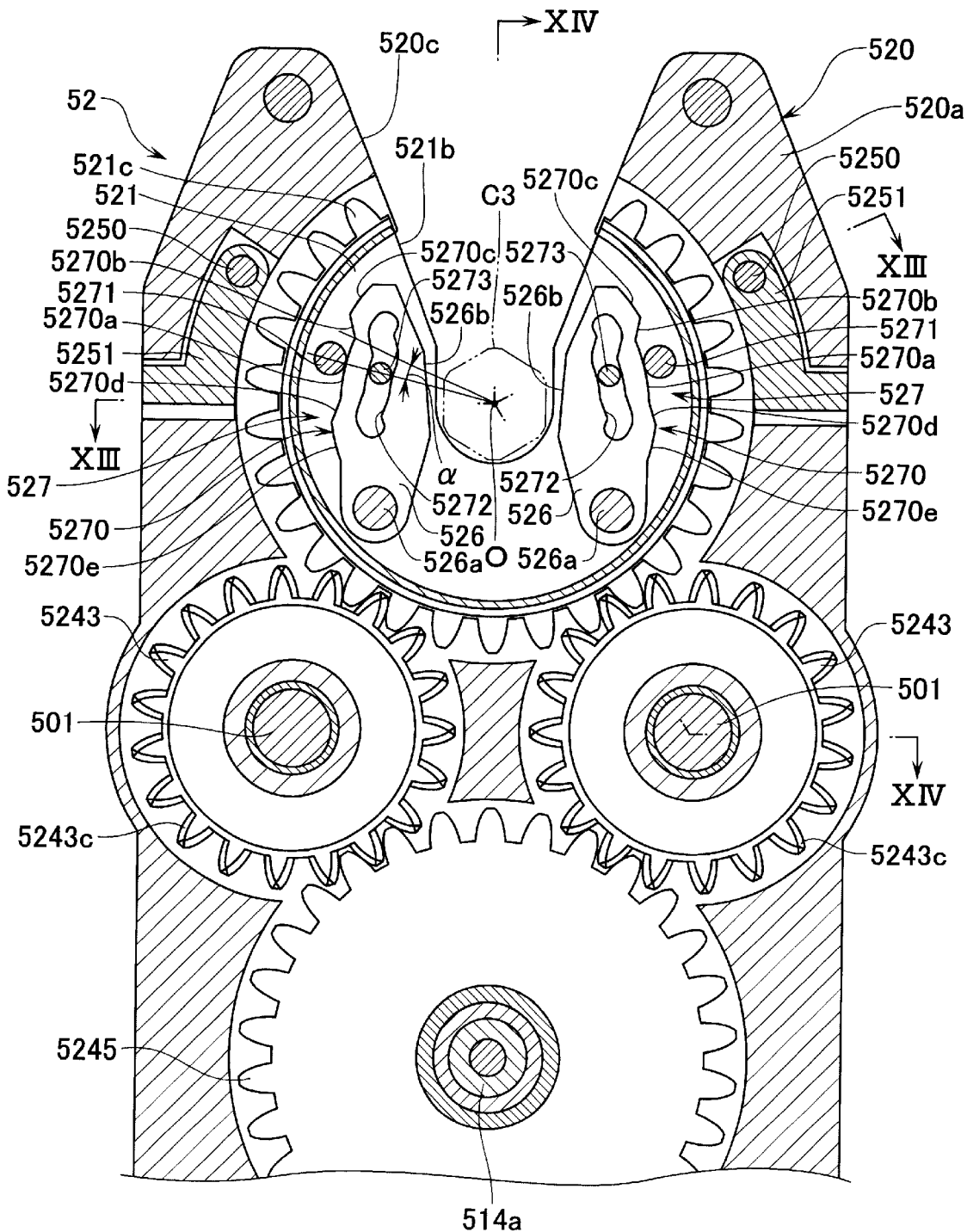
FIG. 11 is a sectional view taken along the line XI—XI in FIG. 7.
Figure 12:
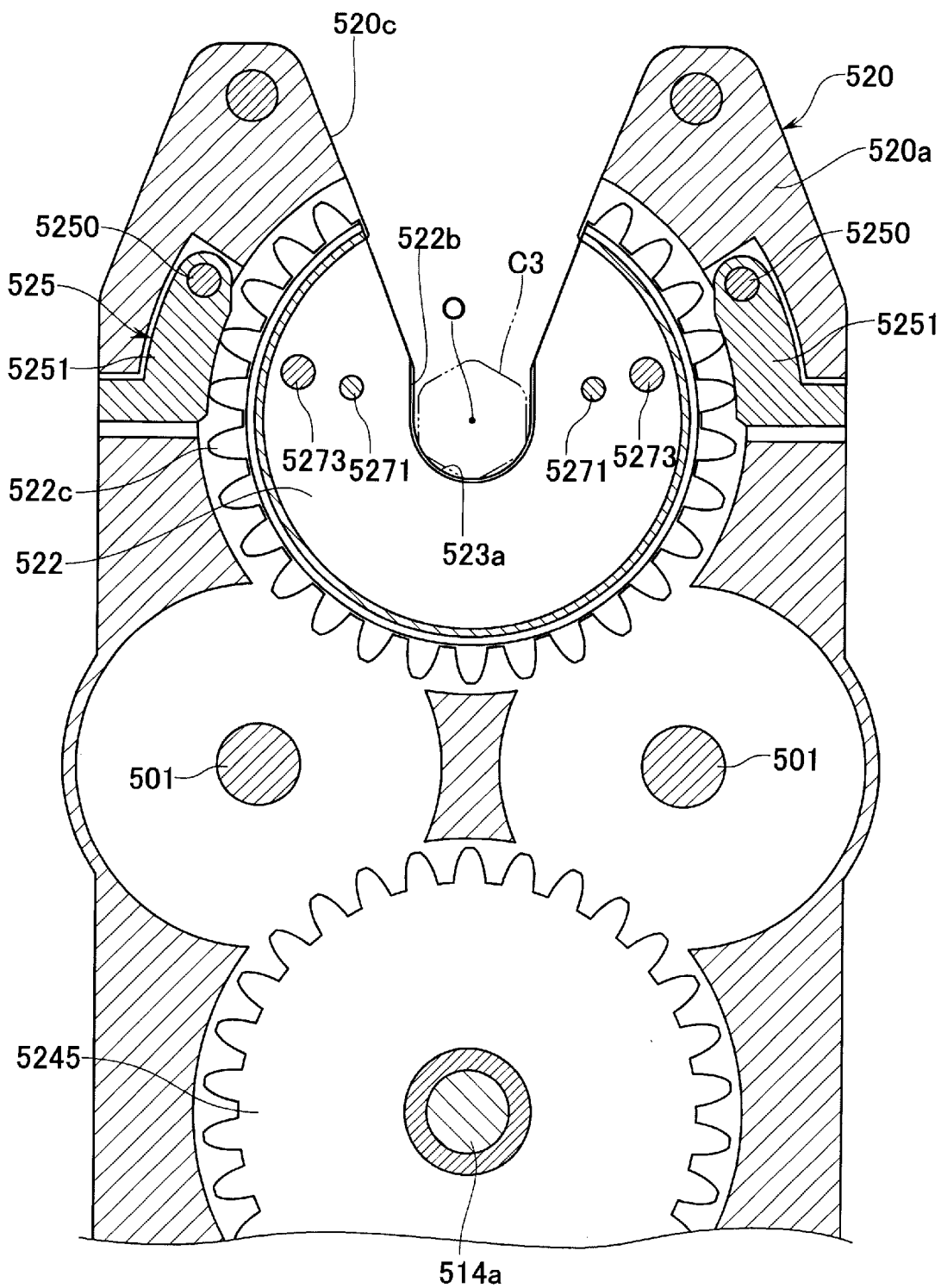
FIG. 12 is a sectional view taken along the line XII—XII in FIG. 7.

At the top end of each of the side plate portions 520a of the stationary casing 520, there is formed an inserting notch 520c for inserting thereinto the tool engaging portion C3 of the tie rod C. The inserting notch is made to such a depth as to reach the circular hole 520b. As shown in FIGS. 11 and 12, in each of the rotary members 521, 522 there is formed an inserting groove 521b, 522b which opens toward the outer circumference. In this manner, if both the rotary members 521, 522 are made into a phase (origin phase) in which the inserting grooves 521b, 522b coincide with the notch 520c, the tool engaging portion C3 can be diametrically inserted into the inserting grooves 521b, 522b through the notch 520c. A plate-shaped rod guide 523 is screwed to the outside surface of the side plate portion 520a which is on the axially outside of the stationary casing 520. An inserting groove 523a into which the tool engaging portion C3 can be diametrically inserted is formed also in this rod guide 523. The bottom portion of this inserting groove 523a is formed into a semicircular shape which is equal in diameter to a circumscribing circle of a cross section of the tool engaging portion C3 and which is coaxial with the above-described axial line "O." By pushing the tool engaging portion C3 into the semicircular bottom portion of the inserting groove 523a, the tool engaging portion C3 can be aligned coaxially with the axial line "O."

The first rotary member 521 is driven by the driving means 524 to rotate in the normal and the reverse directions of rotation. The driving means 524 is made up of: a servomotor 5240 (see FIGS. 2 and 3) which is mounted on the base end portion of the wrench main body 50 and which serves as a driving means; a driving gear 5242 which is rotatably supported near the stationary casing 520 of the wrench main body 50 and which is driven by the servomotor 5240 through a chain 5241 and a gear 5241a; a pair of driven gears 5243, 5243 which are rotatably supported on the stationary casing 520 through supporting shafts 501, 501 so as to be engageable with a tooth portion 521c which is formed on an outer circumference of the first rotary member 521; and two, i.e., first and second, intermediate gears 5244, 5245 which are rotatably supported on the stationary casing 520 through the supporting shaft 502 and the piston rod 514a respectively so as to connect the driving gear 5242 and the driven gears 5243, 5243 together.

The second rotary member 522 can be braked by a brake means 525. The brake means 525 is made up of: a pair of brake shoes 5251, 5251 which are swingably supported inside the stationary casing 520 respectively through a pin 5250 so as to be movable toward and away from an outer circumference of the second rotary member 522; and a cylinder 5253 which is connected to both the brake shoes 5251, 5251 through wires 5252, 5252 and which is mounted on the wrench main body 50. By pulling the brake shoes 5251, 5251 by means of the cylinder 5253 through the wires 5252, 5252, the brake shoes 5251, 5251 come into pressurized contact with the outer circumference of the second rotary member 522, whereby the second rotary member 522 is braked.

The first rotary member 521 is provided with a pair of clamp arms 526, 526 on both sides of the inserting groove 521b which is formed in the first rotary member 521. The clamp arms 526, 526 are swingable in the direction of the groove width of the inserting groove 521b with the respective pins 526a serving as fulcrums. When the first rotary member 521 is rotated in the normal or the reverse direction of rotation, relative to the second rotary member 522, from the basic phase in which the inserting grooves 521b, 522b of both the rotary members 521, 522 coincide with each other, both the clamp arms 526, 526 can be swung by a cam mechanism 527 from the unclamped position, which is outside as seen in the groove width direction, to the clamped position, which is inside as seen in the groove width direction.

The cam mechanism 527 is made up of: a cam portion 5270 which is formed on an outer edge of each of the clamp arms 526; and cam pins 5271 which are fixedly provided in a pair in the second rotary member 522 so as to correspond to both the clamp arms 526, 526 and which come into contact with the cam portion 5270. In the cam portion 5270 there are formed: a first arc portion 5270a which coincides with an arc which is coaxial with the axial line "O" in a state in which the clamp arm 526 is in the unclamped position; a first oblique portion 5270b which obliquely extends diametrically outward from the first arcuate portion 5270a toward the top end of the clamp arm 526; a second arc portion 5270c which extends from the first oblique portion 5270b toward the top end side of the clamp arm 526 and which coincides with an arc which is coaxial with the axial line "O" in a state in which the clamp arm 526 is in the clamped position; a second oblique portion 5270d which obliquely extends diametrically outward from the first arc portion 5270a toward the tail end side of the clamp arm 526; and a third arc portion 5270e which extends from the second oblique portion 5270d toward the tail end side of the clamp arm 526 and which coincides with the arc which is coaxial with the axial line "O" in a state in which the clamp arm 526 is in the clamped position. The cam pin 5271 is disposed such that, when the phase of the first rotary member 521 relative to the second rotary member 522 is in the above-described basic phase, the cam pin 5271 contacts the center of the first arc portion 5270a. In this manner, when the first rotary member 521 is rotated relative to the second rotary member 522 in the normal or the reverse direction of rotation from the basic phase, the following occurs. Namely, when the first rotary member 521 has rotated by an son amount equivalent to an angle of α degrees which is half the center angle of the first arc portion 5270a, the first oblique portion 5270b of the clamp arm 526 which lies in front as seen in the direction of rotation (i.e., the right side in case of clockwise rotation in FIG. 11 and the left side in case of counterclockwise rotation) and the second oblique portion 5270d which lies in a rear as seen in the direction of rotation, come into contact with the cam pin 5271, respectively. Thereafter, as a result of rotation until the second arc portion 5270c of the clamp arm 526 in the front as seen in the direction of rotation and the third arc portion 5270e of the clamp arm 526 in the rear as seen in the direction of rotation, come into contact with the cam pin 5271 respectively, each of the clamp arms 526 is swung from the unclamped position to the clamped position guided by each of the oblique portions 5270b, 5270d.

Figure 15:
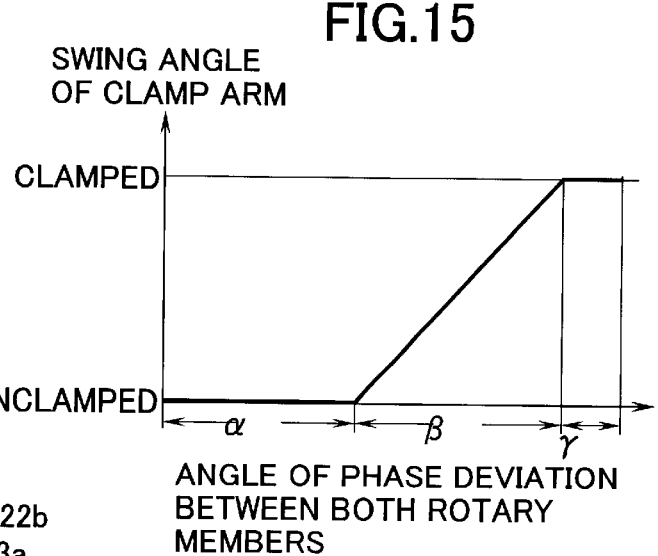
FIG. 15 is a graph showing the relationship between the angle of relative rotation of first and the second rotary members and the swinging angle of a clamp arm.

Each of the clamp arms 526 has formed therein a cam groove 5272 which is geometrically similar to the cam portion 5270. The second rotary member 522 has firmly fixed thereto an engaging pin 5273 which engages with the cam groove 7272. When the first rotary member 521 is rotated, relative to the second rotary member 522, in the direction opposite to the above-described direction to thereby return the first rotary member 521 to the basic phase, each of the clamp arms 526 is returned to the unclamped position by the mutual cooperation between the engaging pin 5273 and the cam groove 5272. In addition, the range of angle of relative rotation of the first rotary member 521 relative to the second rotary member 522 can be restricted to a range which is slightly larger than an angle of rotation which is required to swing the clamp arm 526 from the basic phase to the clamped position by the contact of the engaging pin 5273 with the end portion of the cam groove 5272. FIG. 15 shows the relationship between the angle of relative rotation of the first rotary member 511 relative to the second rotary member 522 and the swing angle of the clamp arm 526 in the groove width direction. In a range in which the angle of relative rotation of the first rotary member 521 is within the above-described angle α, the clamp arm 526 is held in the unclamped position. Within a range of angle exceeding angle α but within angle β, the clamp arm 526 is swung from the unclamped position to the clamped position. Within a range of angle γ which exceeds the angle β but until the relative rotation is restricted, the clamp arm 526 is held in the clamped position.

Figure 16A:
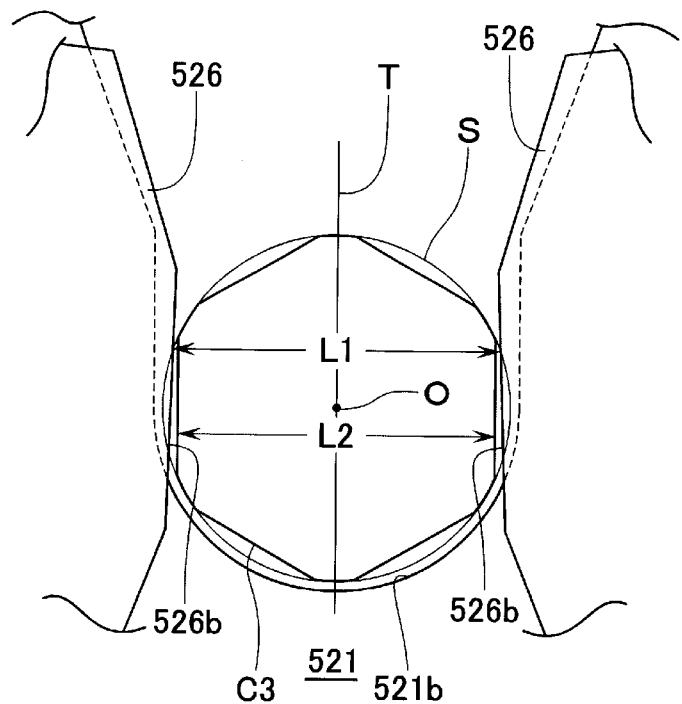
FIG. 16A shows the positions of contact sides when the clamp arm is swung into c clamped position.
Figure 16B:
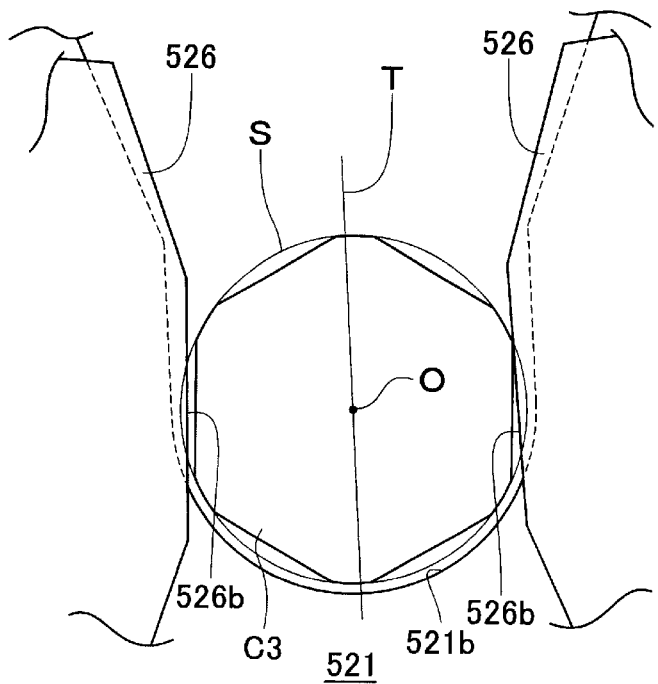
FIG. 16B shows the state of engagement of the contact sides with the tool engaging portion.

Those contact sides 526b, 526b on inner side edges of both the clamp arms 526, 526 which come into contact with the tool engaging portion C3 are formed, as shown in FIG. 16A, to coincide with predetermined two chords at the clamped position. The predetermined two chords lie, on both sides as seen in the groove width direction of the inserting groove, on a circle S which is equal in diameter to the circumscribing circle of the cross section of the tool engaging portion C3 and which is coaxial with the above-described axial line "O". These two chords are inclined, relative to the center line T of the inserting groove 521b, inward as seen in the width direction of the inserting groove toward the open end of the inserting groove 521b. In addition, these two chords are such that the distance L1 between the crossing points of the circle S with both the chords on the side of the open end of the inserting groove 521b is larger than the distance L2 between the opposite sides of cross section of the tool engaging portion C3. By forming the contact sides 526b, 526b in this manner, as shown in FIG. 16B, at the time when the contact sides 526b of the clamp arm 526 in the rear as seen in the direction of rotation of the first rotary member 521 (i.e., right side in FIG. 16B) has come into engagement with a corner portion of the tool engaging portion C3 as a result of rotation of the first rotary member 521, there is still a clearance between the contact side 526b of the clamp arm 526 in the front as seen in the direction of rotation (i.e., left in FIG. 16B) and the tool engaging portion C3. In this manner, even if the clamping position of the clamp arm 526 in the front, as seen in the direction of rotation, deviates inward in the groove width direction to some degree due to the machining tolerance or the like of the cam mechanism 527, the clamp arm 526 in the rear as seen in the direction of rotation holds the tool engaging portion C3 prior to the clamping arm 526 in the front as seen in the direction of rotation.

Figure 14:
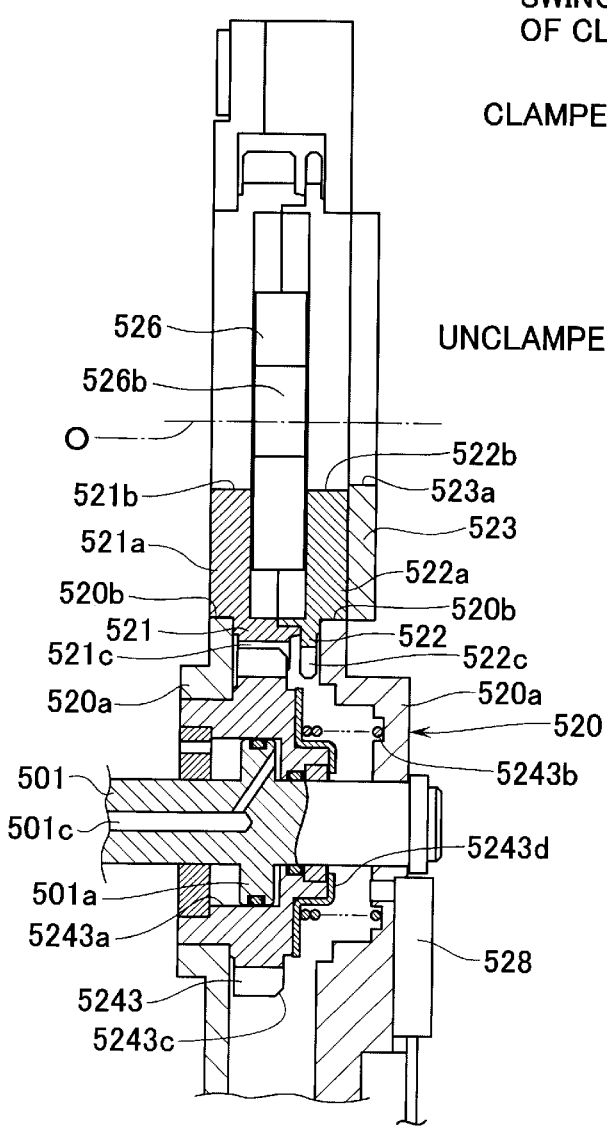
FIG. 14 is a sectional view taken along the line XIV—XIV in FIG. 11.

As shown in FIG. 14, each of the driven gears 5243 is provided with a cylinder portion 5243a for receiving therein a piston 501a which is fixed to the supporting shaft 501 which rotatably supports the driven gears 5243. By supplying air from an air joint 501b which is mounted on an end portion of the supporting shaft 501 (see FIG. 7), into the cylinder portion 5243a through an air passage 501c inside the supporting shaft 501, the driven gear 5243 is axially advanced toward the side in which the second rotary member 522 is disposed. When the air supply is stopped, the driven gear 5243 is returned by a return spring 5243b to the side in which the first rotary member 521 is disposed. Tooth portion 522c is formed in the outer circumference of the second rotary member 522. By moving forth and back the driven gear 5243 in the axial direction as described above, the driven gear 5242 is engaged with, or disengaged from, the tooth portion 522c. At an end portion of the driven gear 5243 there is formed a chamfered portion 5243c. In this manner, even if the phase of the tooth portion 522c of the second rotary member 522 relative to the tooth portion 521c of the first rotary member 521 is deviated to a certain degree, the phase deviation is corrected by the chamfered portion 5243c so that the driven gear 5243 can be engaged with the tooth portion 522c. In addition, the stationary casing 520 is provided with a laser measuring device 528 which detects the position of the driven gear 5243 by reflecting a laser beam from a reflecting plate 5243d which is mounted on an end surface in the forward side of movement of the driven gear 5243.

In performing the adjustment of the tie rod C, i.e., in performing the adjustment of the toe of the front wheel W of the vehicle, the following steps are taken. Namely, the vehicle is stopped in that position of the adjusting station in which the front wheel W is placed on the roller 1. Then, the carriage 3 is lifted to a predetermined height in the Z-axis direction by the rodless cylinder 31. Then, by means of the handle 44, an operator or worker releases the locking of each of the members 40, 41, 42, 43 of the supporting mechanism 4 in the neutral position. The open end wrench 5 is lifted in the Z-axis direction while being assisted by the balance cylinder 33. By utilizing the movements of the first and the second sliding members 42, 43, the open end wrench 5 is adjusted in its position in the vehicle width direction and the vehicle longitudinal direction depending on the position of the tie rod C. The rod end C2 of the tie rod C and the tool engaging portion C3 are inserted into the notch 510b of the movable casing 510 and into the notch 520b of the stationary casing 520 of the open end wrench 5, respectively. At this time, the rotary member 511 of the nut rotating portion 51 is held in the origin phase in which the inserting groove 511b of the rotary member 511 coincides with the notch 510b of the movable casing 510. In addition, the first and the second rotary members 521, 522 of the rod rotating portion 52 are also held in the origin phase in which the inserting grooves 521b, 522b of both the rotary members 521, 522 coincide with the notch 520b of the stationary casing 520. In this manner, by pushing the open end wrench 5 upward, the rod end C2 is inserted into the inserting grooves 511b, 512a of the rotary member 511 and the rod guide 512 of the nut rotating portion 51 through the notch 510b of the movable casing 510. At the same time, the tool engaging portion C3 is inserted into the inserting grooves 521b, 522b, 523a of both the rotary members 521, 522 and the rod guide 523 of the rod rotating portion 52 through the notch 520b of the stationary casing 520. At the time of this insertion, by the movements of the rotary member 41 and the tilting member 42, the open end wrench 5 is rotated about the U-axis and tilted in the vehicle width direction to follow the inclinations in the vehicle width direction and the vertical direction of the tie rod C. By pushing the rod end C2 and the tool engaging portion C3 into the semicircular bottom portion of the inserting grooves 512a, 523a of the rod guides 512, 523, the axial line of rotation "O" of each of the rotary members 511, 521, 522 is aligned with the axial line of the tie rod C. In this state, each of the members 40, 41, 42, 43 of the supporting mechanism 4 is locked.

The following arrangement is also considered. Namely, the tilting member 42 is rotatably supported on the carriage 3 by a shaft which extends in the vehicle longitudinal direction and which crosses the Z-axis at right angles. The open end wrench 5 is then arranged to be tiltable in the vehicle width direction with the shaft serving as a fulcrum. However, this arrangement has the following disadvantage. Namely, as a result of the tilting of the open end wrench 5, its top end tends to largely deviate in the vehicle width direction. Therefore, by merely inserting the tie rod C into the above-described inserting grooves 511b, 512a, 521b, 522b, 523a, there will occur gouging or wrenching between the tie rod C and the inserting grooves, resulting in an unsuccessful tilting of the open end wrench 5. Therefore, it becomes necessary to correct the position of the open end wrench 5 in the vehicle width direction in order to cancel that deviation of the front end of the open end wrench 5 in the vehicle width direction which is accompanied by the tilting of the open end wrench. The positioning work of the open end wrench 5 thus becomes troublesome. On the other hand, in the present embodiment, even if the open end wrench 5 tilts in the vehicle width direction as a result of the movement of the tilting member 42, the top end portion of the open end wench 5 does not deviate in the vehicle width direction. Therefore, by simply inserting the tie rod C into the inserting grooves 511b, 512a, 521b, 522b, 523a, the open end wrench 5 will be smoothly tilted to follow the tie rod C, and the positioning of the open end wrench 5 becomes easy.

Figure 17A:
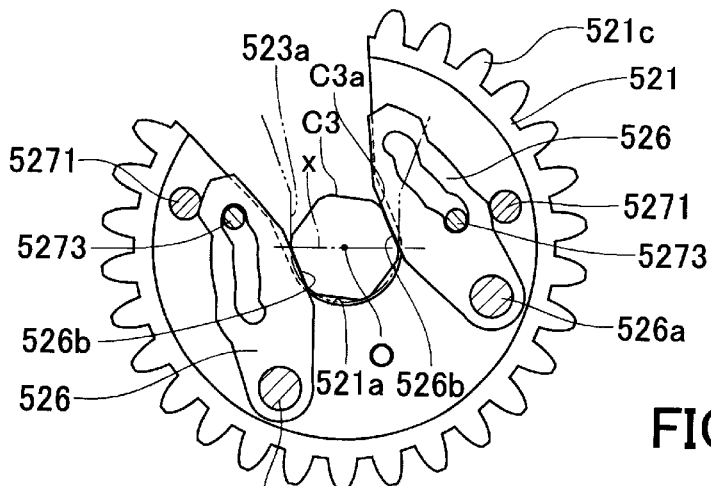
FIG. 17A shows a holding state of the tool engaging portion.
Figure 17B:
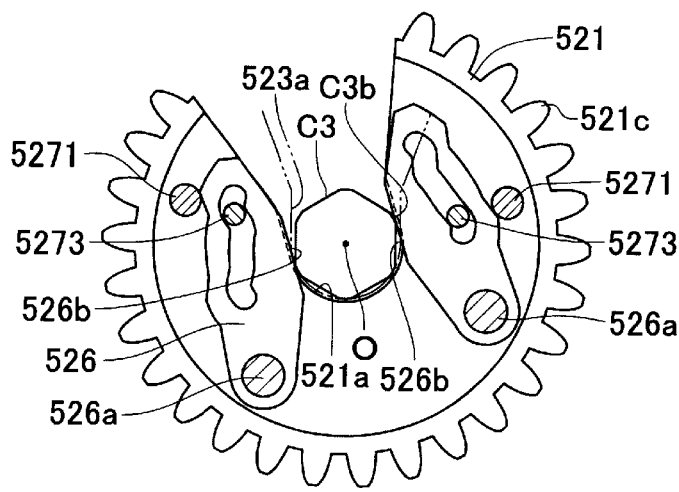
FIG. 17B shows an intermediate state before holding the tool engaging portion which is in a phase different from FIG. 17A.
Figure 17C:
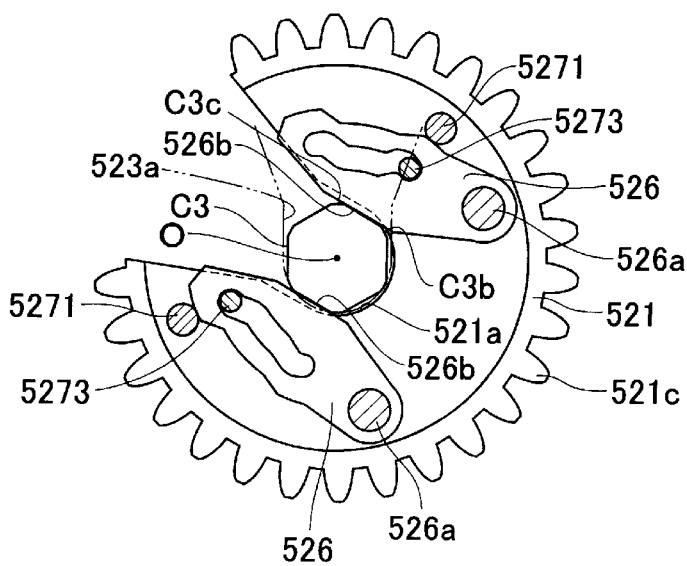
FIG. 17C shows a state of holding the tool holding portion.

Once the positioning of the open end wrench 5 has been completed as described above, then the movable casing 510 is moved in the axial direction. The socket portion 511c of the rotary member 511 is fitted into the lock nut C4, and the lock nut C4 is loosened by rotating the rotary member 511. Further, in a state in which the second rotary member 522 is kept braked by the brake means 525, the first rotary member 521 is rotated by the driving means 524 in a required direction, e.g., in a counterclockwise direction as seen in FIGS. 17A–17C. According to this operation, the first rotary member 521 is relatively rotated from the basic phase relative to the second rotary member 522. By the operation of the cam mechanism 527, a pair of clamp arms 526, 526 are swung from the unclamped position to the clamped position while they are rotated about the axial line.

Here, in case the tool engaging portion C3 is in a phase in which any one of the diagonal lines of the cross-sectional shape of the tool engaging portion C3 coincides with the chord x of the semicircle at the bottom of the inserting groove 523a of the rod guide 523, the contact side 526b of the right clamp arm 526, which is a clamp arm in the rear as seen in the direction of rotation, is engaged, as shown in FIG. 17A, with that right upper corner portion C3a of the tool engaging portion C3 which is away from the bottom portion of the inserting groove 523a.

Further, in case the tool engaging portion C3 is in a phase in which it contacts the bottom portion of the inserting groove 523a at three lower corner portions, the following sometimes occurs. Namely, as shown in FIG. 17B, before the right clamp arm 526 reaches the clamped position, the contact side 526b of the right clamp arm 526 comes into contact with that right corner portion C3b of the tool engaging portion C3 which is away from the bottom portion of the inserting groove 523a. In this case, if the contact side 526b substantially coincides with a tangential line of the circumscribing circle of the cross section of the tool engaging portion C3, the contact side 526b slides relative to the corner portion C3b. At this time, since the swinging of the clamp arm 526 in the inward direction of the inserting groove is restricted by the corner portion C3b, the relative rotation of the first rotary member 521 relative to the second rotary member 522 is intermitted. In other words, the second rotary member 522 rotates together with the first rotary member 521, against the braking force of the brake means 525, by that rotational force from the first rotary member 521 which is transmitted through the cam mechanism 527. Then, at the time when the contact side 526b of the right clamp arm 526 has passed over the corner portion C3b, the relative rotation of the first rotary member 521 relative to the second rotary member 522 is started again, whereby the clamp arm 526 is swung to the clamped position. As shown in FIG. 17C, the contact side 526b of the right clamp arm 526 is thus engaged with the corner portion C3c at the uppermost portion of the tool engaging portion C3.

In this manner, in whichever phase the tool engaging portion C3 may be present. the contact side 526b of the clamp arm 526 in the rear as seen in the direction of rotation comes into contact with the corner portion of the tool engaging portion C3 which is away from the bottom portion of the inserting groove 523a. The tool engaging portion C3 is thus sandwiched between the contact side 526b and the bottom portion of the inserting groove 523a so as to be aligned coaxially with the axial line "O" of both the rotary members 521, 522. Then, the tool engaging portion C3 is prevented from rotating relative to the first rotary member 521 through the clamp arm 526 in the rear as seen in the direction of rotation. Thereafter, the rod main body C1 is rotated integrally with the first rotary member 521 and, by this rotation, the length of the tie rod C varies, resulting in the toe adjustment.

When the toe adjustment has been completed, the lock nut C4 is tightened in the nut rotary portion 51 by the rotation of the rotary member 511. Thereafter, the movable casing 510 is moved to thereby release the rotary member 511 out of the lock nut C4 and then the rotary member 511 is returned to the origin phase. Further, in the rod rotary portion 52, while the second rotary member 522 is kept braked by the brake means 525, the first rotary member 521 is rotated by the driving means 524 in the direction opposite to that at the time of toe adjustment by an amount equivalent to a total angle of $\alpha$ and $\beta$ ($\alpha$ and $\beta$ are shown in FIG. 15). Then, in a state in which the braking of the second rotary member 522 by the brake means 525 is released, each of the driven gears 5243, 5243 is moved forward in the axial direction, whereby each of the driven gears 5243, 5243 is engaged with the tooth portion 522c of the second rotary member 522.

The angle of deviation of both the rotary members 521, 522 from the basic phase, at the time of toe adjustment, becomes a maximum of $\alpha+\beta+\gamma$. Therefore, even if the first rotary member 521 is rotated to return by an angle equivalent to $\alpha+\beta$ as described above, there is a possibility that the phase of the first rotary member 521 relative to the second rotary member 522 deviates from the basic phase by an angle equivalent to $\gamma$. Further, there is also a case in which, before reaching the clamped position, the clamp arm 526 is engaged with the tool engaging portion C3. In this case, too, if the first rotary member 521 is rotated to return by an angle equivalent to $\alpha+\beta$, the phase of the first rotary member 521 relative to the second rotary member 522 deviates from the basic phase. Here, let a pitch angle of the tooth portions 521c, 522c of the first and the second rotary members 521, 522 be defined as e. If the angle of deviation from the basic phase to the positive (+) side or to the negative (−) side is smaller than $\theta/2$, the deviation from the basic phase can be eliminated by engaging the driven gear 5243 with the tooth portion 522c of the second rotary member 522. On the other hand, if the angle of deviation from the basic phase is larger than $\theta/2$, the angle of deviation from the basic phase becomes $\theta$ if the driven gear 5243 is engaged with the tooth portion 522c. However, in a range in which the angle of deviation to the basic phase is below $\alpha$, the clamp arm 526 is held to the unclamped position. Therefore, even if the angle of deviation becomes $\theta$, the clamp arm 526 will not be swung so much from the unclamped position. In this embodiment, the angles $\alpha$, $\beta$, $\gamma$ and $\theta$ are set to 10°, 11°, 3° and 12°, respectively. It is thus so arranged that, even if the angle of deviation from the basic phase is $\theta$, the clamp arm 526 does not project into the groove width of the inserting groove 521b of the first rotary member 521.

When the engagement of the driven gear 5243 with the tooth portion 522c of the second rotary member 522 has been confirmed by the signal from the laser measuring it device 528, then the first rotary member 521 is rotated by the driving means 524 to return it to the origin phase. Thereafter, the driven gear 5243 is moved backward to thereby release it out of engagement with the tooth portion 522c of the second rotary member 522. In this state the carriage 3 is lowered to thereby release the open end wrench 5 from the tie rod C. Here, when the first rotary member 521 is returned to the origin phase, the second rotary member 522 is also integrally rotated through the driven gear 5243. Therefore, due to the phase deviation of the second rotary member 522 relative to the first rotary member 521, the clamp arm 526 can be surely prevented from being projected into the width of the inserting groove 521b. In this manner, the clamp arm 526 can be prevented from getting caught by the tool engaging portion C3. The open end wrench 5 can thus be smoothly released from the tie rod C. In addition, even if the phase of the second rotary member 522 relative to the first rotary member 521 is deviated by the angle of $\theta$ from the basic phase, when the open end wrench 5 is released off from the tie rod C, the tool engaging portion C3 is in sliding contact with the side edge of the inserting groove 522b of the second rotary member 522. In this manner, the deviation of the second rotary member 522 off the basic phase is corrected, whereby the releasing of the open end wrench 5 can be performed without any trouble.

Figure 18:
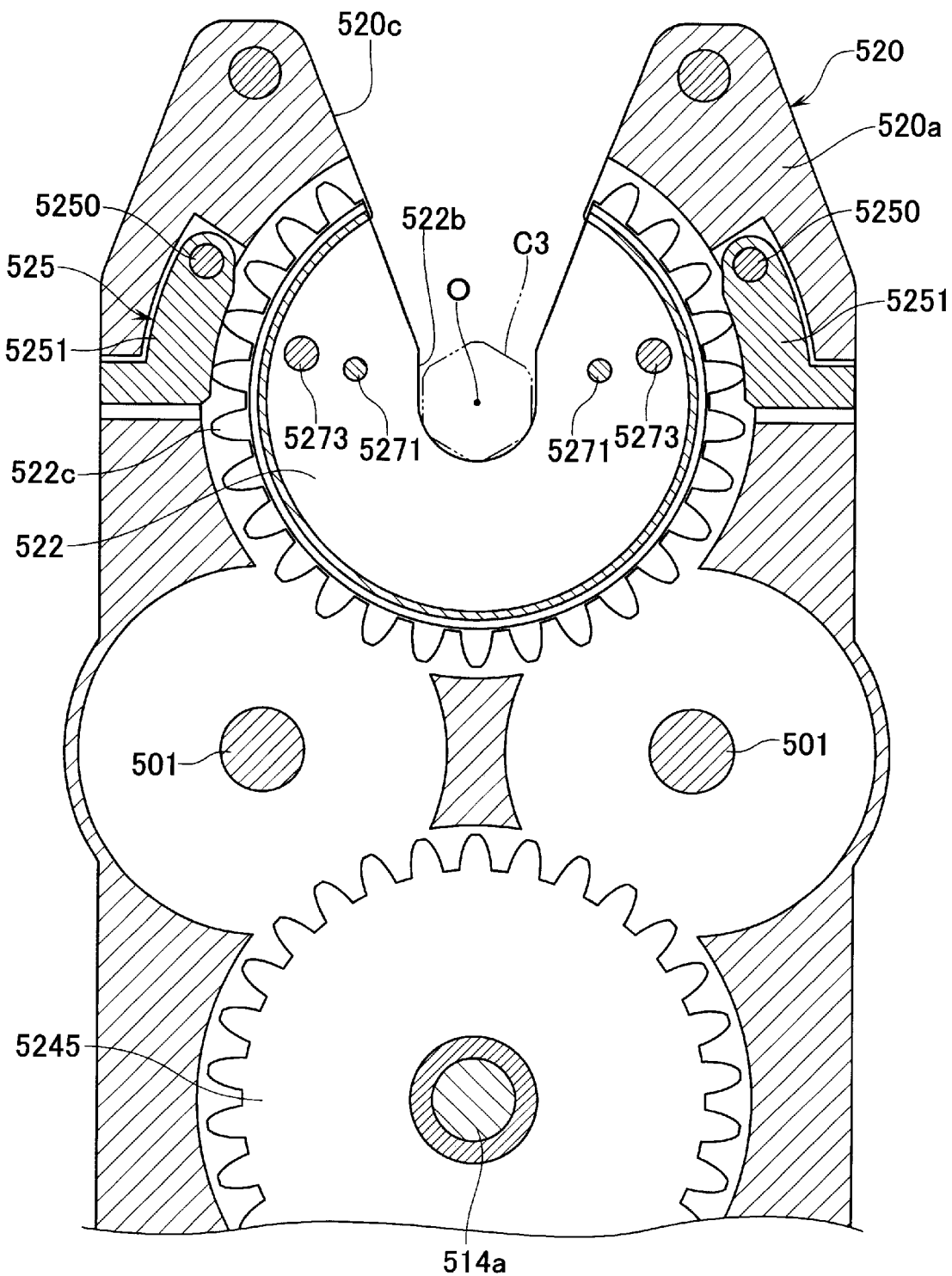
FIG. 18 is a sectional view, corresponding to FIG. 12, of another embodiment according to the present invention.
Figure 19:
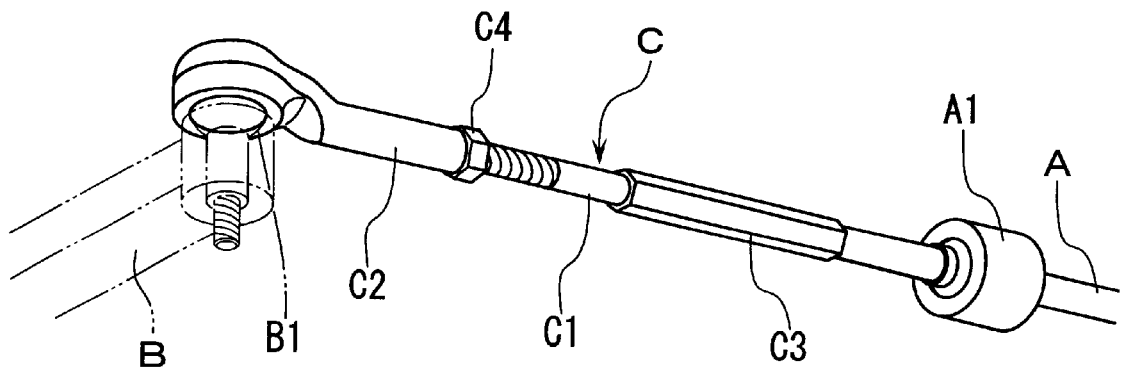
FIG. 19 is a perspective view of a tie rod.
Figure 20:
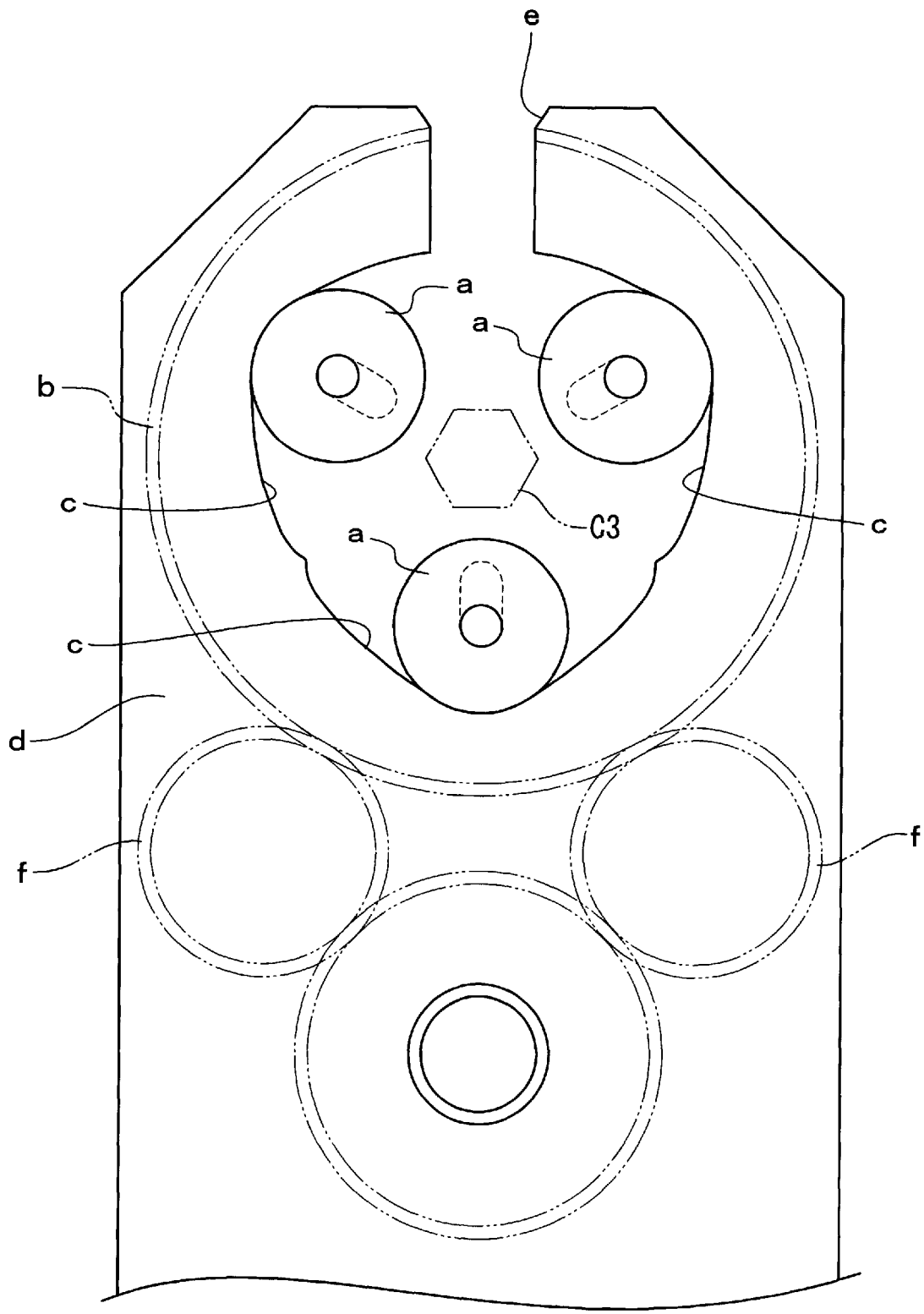
FIG. 20 is a side view of an important portion of a conventional open end wrench.

In the above-described embodiment, the bottom portions of the inserting grooves 521b, 522b of both the first and the second rotary members 521, 522 are formed into semicircles larger than the circumscribing circle of the cross section of the tool engaging portion C3. The bottom portion of the inserting groove 522b of the second rotary member 522 may also be formed into a semicircle, as shown in FIG. 18, which is the same in diameter as the above-described circumscribing circle and which is coaxial with the above-described axial line "O." In this arrangement, too, the tool engaging portion C3 can be held coaxially with the axial line "O" in a state in which the tool engaging portion C3 is sandwiched between the bottom portion of the inserting grove 522b and the clamp arm 526 in the rear as seen in the direction of rotation. In this arrangement, the rod guide 523 is not required.

Further, in the above-described embodiment, the first rotary member 521 is provided with the clamp member made up of the clamp arm 526. Provided the accuracy of the cam mechanism which operates the clamp member by the relative rotation of the first rotary member 521 relative to the second rotary member 522, the clamp member may also be mounted on the second rotary member 522 in the same manner as in the conventional open end wrench.

It is readily apparent that the above-described apparatus for adjusting a tie rod meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In an apparatus for adjusting a tie rod built in a steering mechanism of a vehicle, said tie rod having a rod main body and a tool engaging portion formed in hexagonal cross section in the rod main body;

an open end wrench having a wrench main body and having a rod rotating portion at a top end portion thereof, said rod rotating portion being adapted to be engaged with the tool engaging portion to rotate the rod main body in normal or reverse direction of rotation for adjustment of the tie rod;

a carriage for moving said open end wrench toward and away from the tie rod from a lower side of the vehicle staying at a predetermined position; and a supporting mechanism for supporting said open end wrench on said carriage, said supporting mechanism having a freedom of four axes and supporting said open end wrench so as to be movable in a vehicle width direction and a vehicle longitudinal direction, tiltable in the vehicle width direction, and rotatable about a longitudinal axial line of said open end wrench, the improvement comprising:

said supporting mechanism having a tilting member for tilting said open end wrench in the vehicle width direction said tilting member being constituted such that said open end wrench is tilted in the vehicle width direction by an arcuate movement of said tilting member, a center of an arc of the arcuate movement being coincident with the top end portion of said open end wrench.

2. An apparatus for adjusting a tie rod according to claim 1, wherein said open end wrench further comprises:

a pair of first rotary member and second rotary member constituting said rod rotating portion, each being supported at a top end portion of the wrench main body so as to be rotatable about an identical axial line, each having an inserting groove into which the tool engaging portion can be diametrically inserted;

a clamp member mounted on one of said first rotary member and said second rotary member, so as to be movable between a clamped position in which the tool engaging portion is held in position and an unclamped position in which said holding is released;

a cam mechanism for moving said clamp member from the clamped position to the unclamped position when said first rotary member is rotated relative to said second rotary member in normal or reverse direction of rotation from a basic phase in which inserting grooves of both said rotary members coincide with each other;

driving means for driving said first rotary member through a gear which is engaged with a tooth portion formed in an outer circumference of said first rotary member;

brake means for braking said second rotary member, wherein said gear is moveable forth and back in an axial direction such that said gear is engaged with, and disengaged from, a tooth portion formed in an outer circumference of said second rotary member.

3. An apparatus for adjusting a tie rod according to claim 2, wherein said cam mechanism is arranged such that said clamp member is held in the unclamped position until an angle of rotation of said first rotary member from said basic phase relative to said second rotary member has exceeded a predetermined range of angle.

4. An apparatus for adjusting a tie rod according to claim 1, wherein said open end wrench further comprises:

a rod guide which is fixed to a top end portion of the wrench main body and which has an inserting groove into which the tool engaging portion can be diametrically inserted;

a pair of first rotary member and second rotary member constituting said rodrotating portion, each being supported at said top end portion of said wrench main body so as to be rotatable about an identical axial line, each having an inserting groove into which the tool engaging portion can be diametrically inserted;

a pair of clamped arms, each having contact sides contacting said tool engaging portion, which are positioned on both sides of said inserting groove of said first rotary member and which are rotatably supported by said first rotary member so as to be swingable in a width direction of said inserting groove;

a cam mechanism for moving both said clamp arms inward in the groove width direction to a predetermined clamped position when said first rotary member is rotated relative to said second rotary member in normal or reverse direction of rotation from a basic phase in which inserting grooves of both side rotary members coincide with each other;

driving means for driving said first rotary member in normal or reverse direction of rotation;

brake means for braking said second rotary member, wherein a bottom portion of said inserting groove of said rod guide is formed into a semicircle which is equal in diameter to a circumscribing circle of a cross section of said tool engaging portion and which is coaxial with said axial line, wherein both said clamp arms are formed such that, at the clamped position, the contact sides of both said clamp arms which contact the tool engaging portion coincide with predetermined chords, among chords on both sides as seen in the groove width direction of the inserting groove of said first rotary member, on a circle which is equal in diameter to said circumscribing circle and which is coaxial with said axial line, said predetermined chords being inclined, relative to a center line of said inserting groove of said first rotary member, inward as seen in the groove width direction, and having a larger distance between points of crossing of the circle with said predetermined chords at the open end side of the inserting groove of said first rotary member than a distance between opposite sides of cross-section of the tool engaging portion.

5. An apparatus for adjusting a tie rod according to claim 1, wherein said open end wrench further comprises:

a pair of first rotary member and second rotary member constituting said rod rotating portion, each being supported at a front end portion of said wrench main body so as to be rotatable about an identical axial line, each having an inserting groove into which the tool engaging portion can be diametrically inserted;

a pair of clamp arms each having contact sides contacting said tool engaging portion which are positioned on both sides of said inserting groove of said first rotary member and which are rotatably supported by said first rotary member so as to be swingable in a width direction of said inserting groove;

a cam mechanism for moving both said clamp arms inward in the groove width direction to a predetermined unclamped position when said first rotary member is rotated relative to said second rotary member in normal or reverse direction of rotation from a basic phase in which inserting grooves of both said rotary members coincide with each other;

driving means for driving said first rotary member in normal or reverse direction of rotation;

brake means for braking said second rotary member, wherein a bottom portion of said inserting groove of said second rotary member if formed into a semicircle which is equal in diameter to a circumscribing circle of a cross section of said tool engaging portion and which is coaxial with said axial line, wherein both said clamp arms are formed such that, at the clamped position, the contact sides of both said clamp arms which contact the tool engaging portion coincide with predetermined chords, among chords on both sides as seen in the groove width direction of the inserting groove of said first rotary member, on a circle which is equal in diameter to said circumscribing circle and which is coaxial with said axial line, said predetermined chords being inclined, relative to a center line of said inserting groove of said first rotary member, inward as seen in the groove width direction, and having a larger distance between points of crossing of the circle with said predetermined chords at the open end side of the inserting groove of said first rotary member than a distance between opposite sides of cross-section of the tool engaging portion.

* * * * *

UNITED STATES PATENT AND TRADEMARK OFFICE
CERTIFICATE OF CORRECTION

PATENT NO. : 6,308,593 B1  Page 1 of 1
DATED : October 30, 2001
INVENTOR(S) : Takao Shibayama, Atsushi Osada and Masaru Maruo It is certified that error appears in the above-identified patent and that said Letters Patent is hereby corrected as shown below:

<u>Drawings,</u>
FIG. 12, "5271" should read -- 5273 -- at two instances; and
"5273" should read -- 5271 -- at two instances.
FIG. 18, "5271" should read -- 5273 -- at two instances; and
"5273" should read -- 5271 -- at two instances.

<u>Column 8,</u>
Line 31, "433" should read -- 433a --;

<u>Column 12,</u>
Line 1, "7272" should read -- 5272 --;
Line 15, "511" should read -- 521 --.

<u>Column 13,</u>
Line 60, "42" should read -- 40 --;

<u>Column 14,</u>
Lines 4 and 25, "42" should read -- 40 --;

Signed and Sealed this

Twentieth Day of May, 2003

JAMES E. ROGAN
*Director of the United States Patent and Trademark Office*